(12) United States Patent
Katsuragi et al.

(10) Patent No.: US 10,023,211 B2
(45) Date of Patent: Jul. 17, 2018

(54) TRAIN POSITION DETECTING DEVICE

(71) Applicant: Mitsubishi Electric Corporation, Chiyoda-ku (JP)

(72) Inventors: Takaya Katsuragi, Tokyo (JP); Koki Yoshimoto, Tokyo (JP); Wataru Tsujita, Tokyo (JP); Tomoaki Takewa, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/524,308

(22) PCT Filed: Jan. 21, 2016

(86) PCT No.: PCT/JP2016/051634
§ 371 (c)(1),
(2) Date: May 4, 2017

(87) PCT Pub. No.: WO2016/121606
PCT Pub. Date: Aug. 4, 2016

(65) Prior Publication Data
US 2018/0009454 A1 Jan. 11, 2018

(30) Foreign Application Priority Data
Jan. 28, 2015 (JP) .................. 2015-013972

(51) Int. Cl.
*B61L 25/02* (2006.01)
*G01S 19/45* (2010.01)
*G01S 19/50* (2010.01)

(52) U.S. Cl.
CPC ............ *B61L 25/025* (2013.01); *G01S 19/45* (2013.01); *G01S 19/50* (2013.01); *B61L 2205/04* (2013.01)

(58) Field of Classification Search
CPC .... B61L 25/025; B61L 2205/04; G01S 19/45; G01S 19/50
See application file for complete search history.

(56) References Cited

U.S. PATENT DOCUMENTS 9,050,983 B2 6/2015 Tokumaru
9,266,543 B2 2/2016 Takagi

FOREIGN PATENT DOCUMENTS

JP 07-294622 A 11/1995
JP 2003-294825 A 10/2003
(Continued)

OTHER PUBLICATIONS

International Search Report dated Apr. 19, 2016 in PCT/JP2016/051634, filed on Jan. 21, 2016.

*Primary Examiner* — Michael D Lang
(74) *Attorney, Agent, or Firm* — Oblon, McClelland, Maier & Neustadt, L.L.P.

(57) ABSTRACT

A train position detecting device includes: a GPS position guarantee range calculation part for calculating, based on a result of measurement of a position of a train by GPS signals; a tachogenerator-position guarantee range calculation part for calculating, based on a result of measurement of a position of the train by a tachometer generator that measures a relative distance from a measurement carried out previously; and a position determination part that determines, between an end part of the GPS position guarantee range in the first-direction and an end part of the tachogenerator-position guarantee range in the first-direction, a position of an end part on the positive side of the second direction to be a position of the end part of the train in the first-direction.

5 Claims, 16 Drawing Sheets

(56) References Cited

FOREIGN PATENT DOCUMENTS

| | | |
|---|---|---|
| JP | 2009-042179 A | 2/2009 |
| JP | 2011-225188 A | 11/2011 |
| JP | 2012-144068 A | 8/2012 |
| JP | 2013-023054 A | 2/2013 |
| JP | 2013-099234 A | 5/2013 |
| WO | 2012/077184 A1 | 6/2012 |

F I G. 1
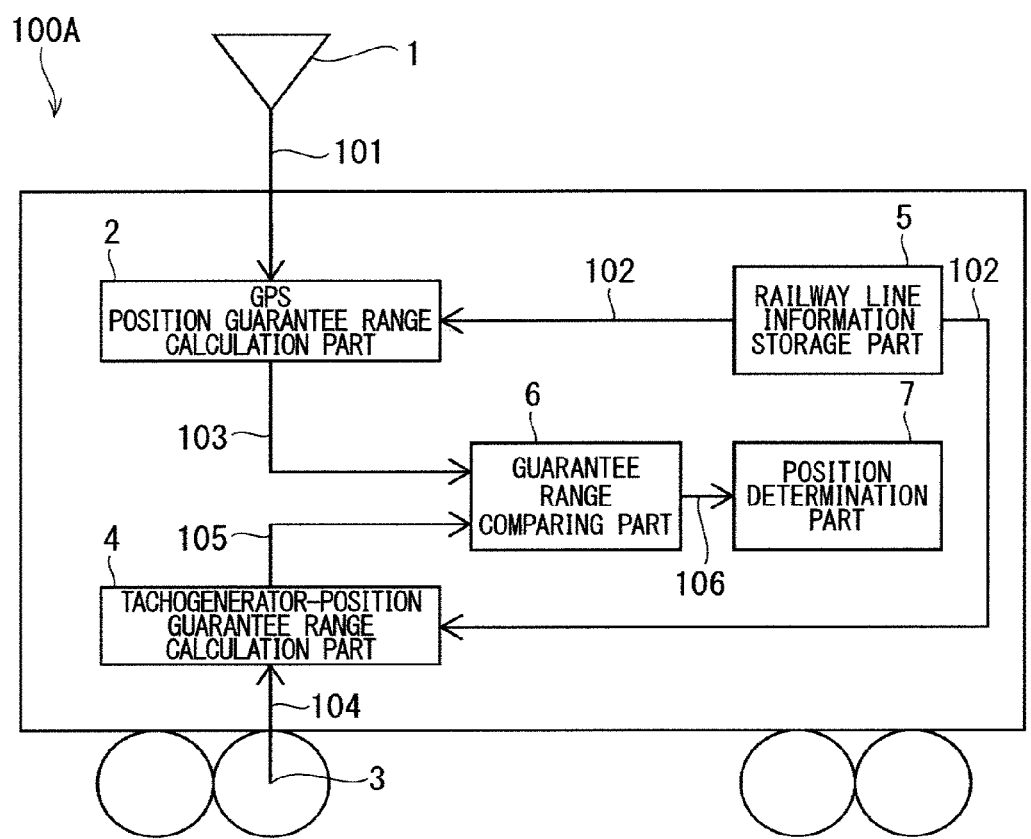

F I G. 1 0
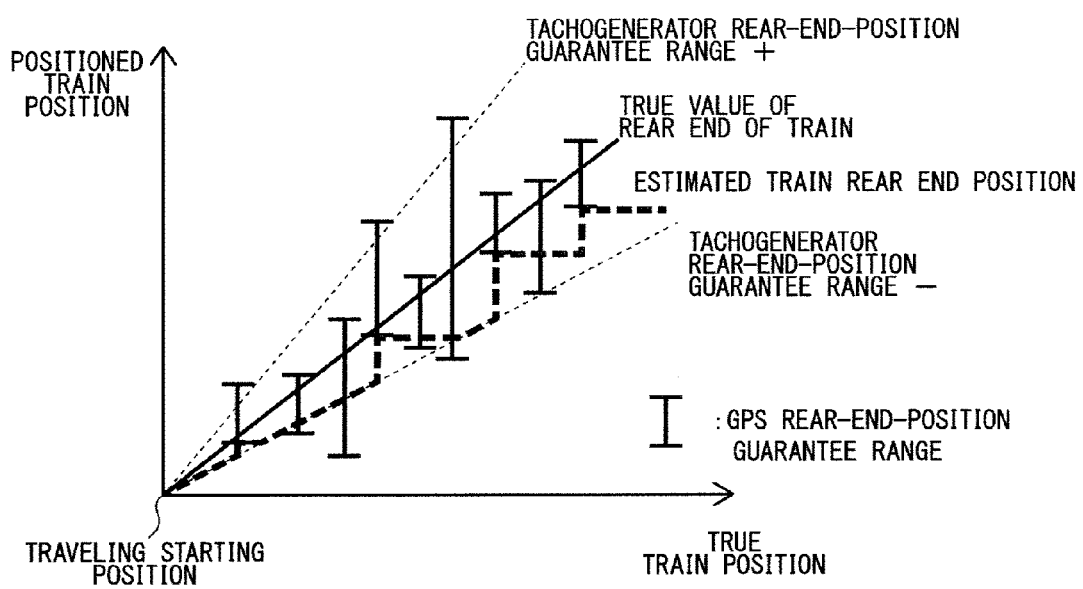

F I G. 1 2
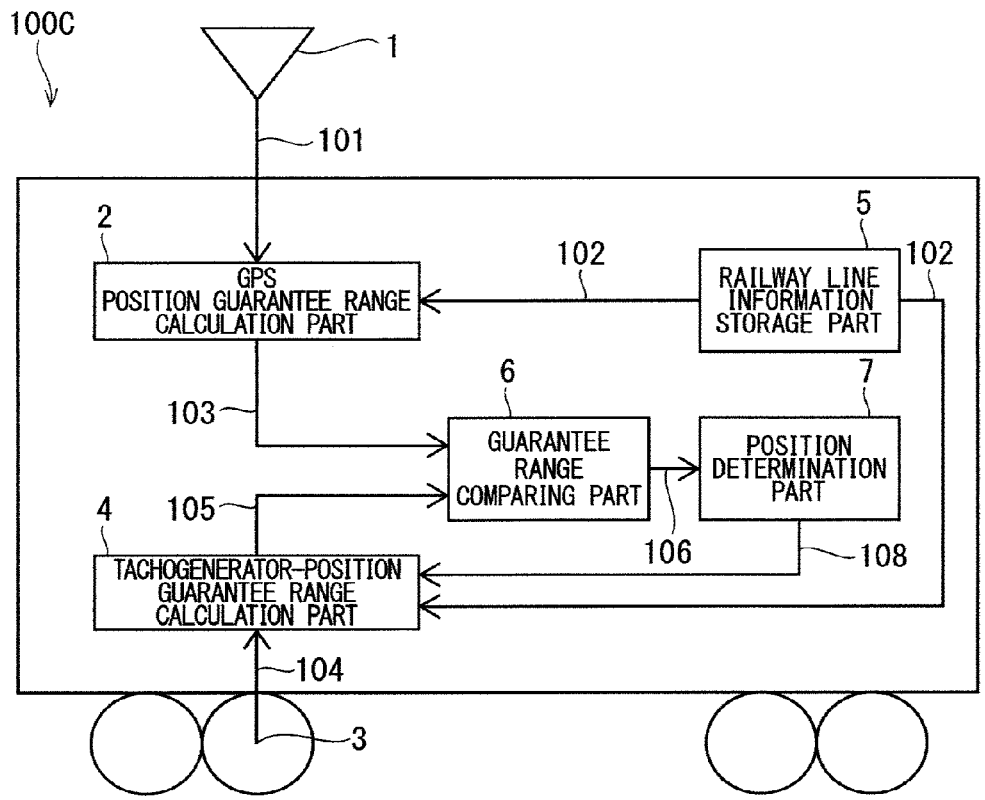
F I G. 1 3
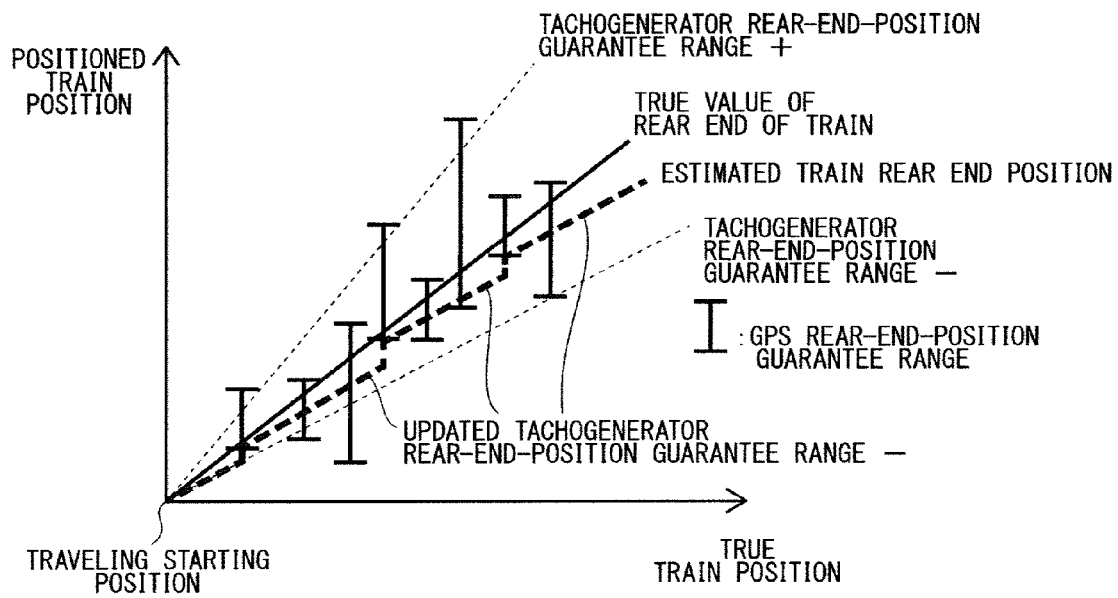

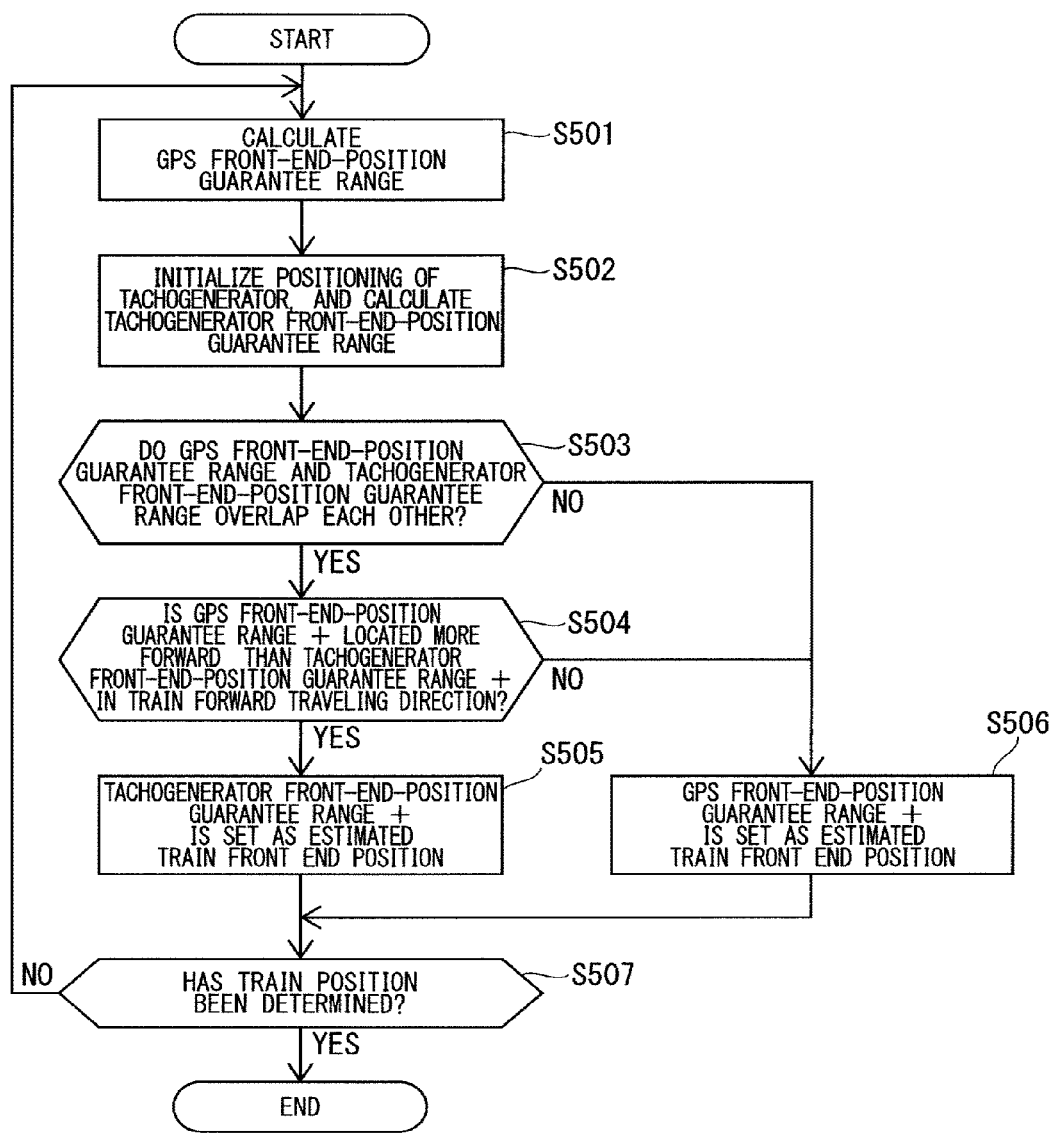
F I G. 1 8

TRAIN POSITION DETECTING DEVICE

TECHNICAL FIELD

The present invention relates to a train position detecting device that detects a position of a train on a railway line by using an absolute-position positioning method and a relative-position positioning method in combination.

BACKGROUND ART

In the current railway field, as a method for detecting a position of a train, a method in which an absolute distance received from a position correction track antenna installed on the ground is used as a starting point, and a relative distance to the position correction track antenna is measured from the number of rotations of wheels by a tachometer generator mounted on the train is mainstream. However, there is a problem in that a position of a train becomes inaccurate due to a failure in communication with a track antenna, an error of a wheel diameter caused by wear of a wheel or the like, and an idling slip of a wheel.

Accordingly, there is devised a method in which an absolute position of a train is constantly measured by GPS satellites. The positioning by the GPS (Global Positioning System) satellites is accompanied by a positioning error caused by a decrease in signal reception sensitivity, multipath or the like. Therefore, Patent Document 1 discloses a method in which a position of a train is determined in consideration of reliability of position accuracy based on the GPS satellites so as to control the train.

PRIOR ART DOCUMENTS

Patent Documents

Patent Document 1: Japanese Patent No. 4,786,001

SUMMARY OF INVENTION

Problems to be Solved by the Invention

However, when GPS is used for a moving block system in which train formations are made as close as possible to each other while a required minimum distance between the train formations required for security is maintained, an error of positioning of a train position cannot be taken into consideration merely by evaluating the train position by means of the reliability of GPS satellites as disclosed in Patent Document 1. Therefore, there is a problem in that excessive margin distances should be kept for front and rear ends of a train respectively, and therefore the train control cannot be carried out with the distance between train formations sufficiently shortened.

The present invention has been made in view of the above-described problems, and an object thereof is to provide a train position detecting device capable of setting a distance between train formations short.

Means for Solving the Problems

A train position detecting device according to the present invention includes: an absolute position guarantee range calculation part for calculating, based on a result of measurement of a position of a train by an absolute distance measuring sensor, an absolute position guarantee range that is an estimated range of a position of an end part of the train in consideration of a measurement error; a relative position guarantee range calculation part for calculating, based on a result of measurement of a position of the train by a relative distance measurement sensor that measures a relative distance from a measurement carried out previously, a relative position guarantee range that is an estimated range of a position of an end part of the train in consideration of a measurement error; and a position determination part that sets one of a train forward traveling direction and a train backward traveling direction to be a first direction and the other to be a second direction, and determines, between an end part of the absolute position guarantee range in the first direction and an end part of the relative position guarantee range in the first direction, a position of an end part on a positive side of the second direction to be a position of the end part of the train in the first direction, wherein the absolute position guarantee range includes an absolute rear-end-position guarantee range that is an estimated range of a position of a rear end part of the train, the relative position guarantee range includes a relative rear-end-position guarantee range that is an estimated range of a position of the rear end part of the train, the position determination part determines, between an end part of the absolute rear-end-position guarantee range in the train backward traveling direction and an end part of the relative rear-end-position guarantee range in the train backward traveling direction, a position of the end part on the positive side of the train forward traveling direction to be a position of the rear end part of the train, and the relative position guarantee range calculation part accumulates a newly measured value by the relative distance measurement sensor and a measurement error thereof to a relative rear-end-position guarantee-range initial value, which is calculated based on the measurement result previously obtained by the relative distance measurement sensor, to calculate the relative rear-end-position guarantee range, and when the end part of the relative rear-end-position guarantee-range initial value in the train backward traveling direction is more on a negative side of the train forward traveling direction than the position of the rear end part of the train previously determined by the position determination part, calculates the relative rear-end-position guarantee range by using, as the relative rear-end-position guarantee-range initial value, the position of the rear end part of the train previously determined by the position determination part.

Effects of the Invention

In accordance with the train position detecting device according to the present invention, between the end part of the absolute position guarantee range in the first direction and the end part of the relative position guarantee range in the first direction, a position of an end part that is on the positive side of the second direction is determined to be a position of the end part of the train in the first direction, and therefore a margin distance can be further shortened as compared to a case where a position of the end part of the train is estimated only based on the absolute position guarantee range or only based on the relative position guarantee range. Therefore, a distance between train formations can be set short. In addition, the estimated train rear end position does not move back to the negative side of the train forward traveling direction, and a positioning error at the rear end position of the train is shortened.

BRIEF DESCRIPTION OF DRAWINGS

FIG. 1 is a block diagram illustrating a configuration of a train position detecting device according to a first embodiment.

FIG. 10 is a chart illustrating a transition of an estimated train rear end position by the train position detecting device according to the third embodiment.

FIG. 12 is a block diagram illustrating a configuration of a train position detecting device according to a fourth embodiment.

FIG. 13 is a chart illustrating a transition of an estimated train rear end position by the train position detecting device according to the fourth embodiment.

FIG. 18 is a flowchart illustrating an operation of the train position detecting device according to the fifth embodiment.

DESCRIPTION OF EMBODIMENTS

<A. First Embodiment>

Figure 2:
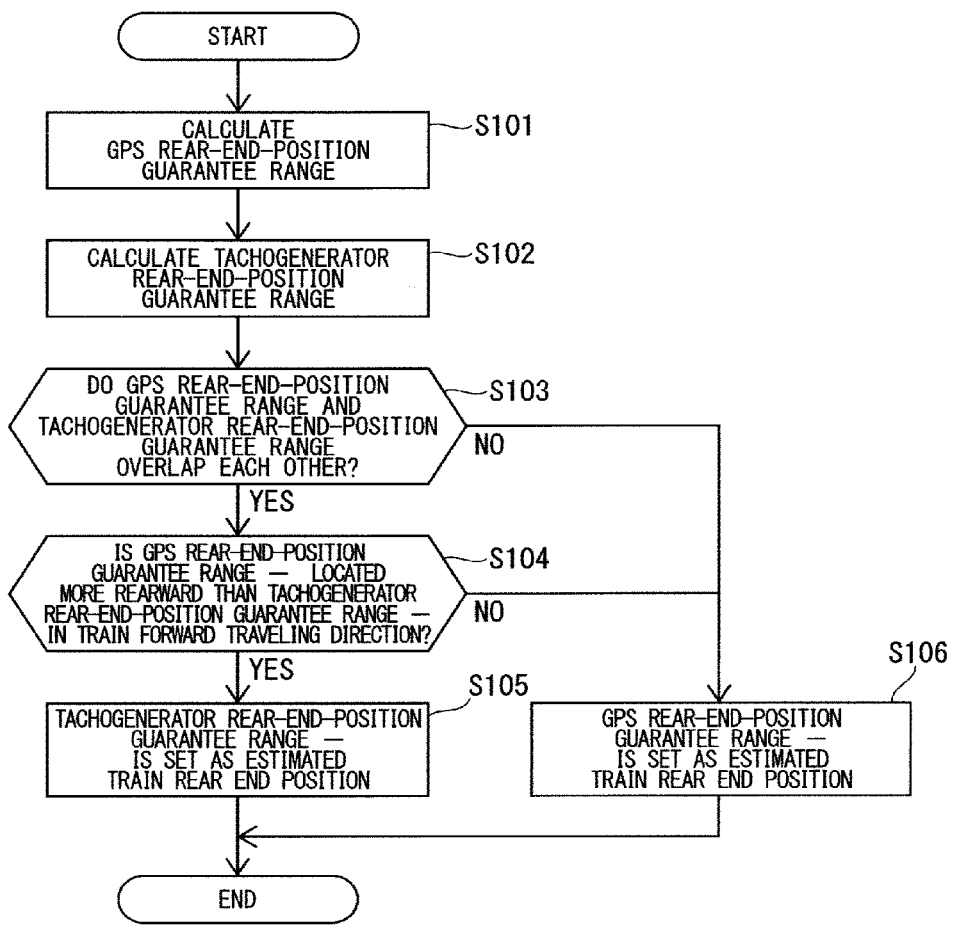
FIG. 2 is a flowchart illustrating an operation of the train position detecting device according to the first embodiment.

In a first embodiment of the present invention, processing for shortening a margin distance with respect to a rear end position of an own train will be described. The processing enables a following train that follows the own train to appropriately shorten an interval between the trains.

<A-1. Configuration>

FIG. 1 is a diagram illustrating a configuration of a train position detecting device 100A according to the first embodiment. In the drawings, identical or corresponding components are denoted by the same reference numerals, and this is to be common to the entire text of the description. In addition, forms of components that appear in the description are merely illustrative, and are not intended to be limited to the description.

In FIG. 1, the train position detecting device 100A is provided with a GPS antenna 1, a GPS position guarantee range calculation part 2, a tachometer generator 3, a tacho-generator-position guarantee range calculation part 4, a railway line information storage part 5, a guarantee range comparing part 6 and a position determination part 7. It should be noted that in the present specification and drawings, "tachometer generator" may also be referred to as "tachogenerator".

The GPS antenna 1 receives, from GPS satellites, GPS signals 101 for determining a position of the GPS antenna 1.

The GPS position guarantee range calculation part 2 obtains the GPS signals 101 from the GPS antenna 1 and railway line information 102 from the railway line information storage part 5, and calculates a GPS position guarantee range 103 based on the signals and the information. The GPS position guarantee range 103 is a position range in which a train is present, the position range being estimated based on the GPS signals 101. More specifically, the GPS position guarantee range 103 is a position range of the GPS antenna 1 mounted to the train. The position "range" is used herein because a measurement error is taken into consideration.

The tachometer generator 3 is mounted to an axle of the train, and measures the number of rotations of wheels.

The tachogenerator-position guarantee range calculation part 4 calculates a tachometer generator-position guarantee range (tachogenerator-position guarantee range) 105 based on a wheel rotation number signal 104 measured by the tachometer generator 3. The tachogenerator-position guarantee range 105 is a position range in which the train is present, the position range being estimated based on the wheel rotation number signal 104. More specifically, the tachogenerator-position guarantee range 105 is a position range of the axle of the train, the tachometer generator 3 being mounted to the axle. The position "range" is used herein because a measurement error is taken into consideration.

The railway line information storage part 5 stores railway line information 102. The railway line information 102 is information used to calculate the GPS position guarantee range 103 and the tachogenerator-position guarantee range 105, and includes, for example, a relationship between latitude/longitude or a travel distance and a route distance in km, branching information, track number information or slope information.

The guarantee range comparing part 6 obtains the GPS position guarantee range 103 from the OPS position guarantee range calculation part 2 and the tachogenerator-position guarantee range 105 from the tachogenerator-position guarantee range calculation part 4, and compares these ranges. This comparison processing will be described later.

The position determination part 7 obtains a comparison result 106 from the guarantee range comparing part 6, and estimates a position of the train based on this comparison result. More specifically, a rear end position of the train is estimated. It should be noted that the rear end position of the train, which is estimated herein, is referred to as an "estimated train rear end position".

<A-2. Operation>

FIG. 2 is a flowchart illustrating an operation of the train position detecting device 100A. The operation of the train position detecting device 100A will be described below with reference to FIGS. 1 and 2.

The GPS position guarantee range calculation part 2 is an example of an absolute position guarantee range calculation part that calculates an absolute position guarantee range based on a measurement result of an absolute distance measuring sensor. In other words, the GPS position guarantee range calculation part 2 obtains the GPS signals 101 from the GPS antenna 1, and calculates a distance in km indicating a unique position on a route of the train based on the GPS signals 101 with the railway line information 102 used as constraint conditions. In addition, the GPS position guarantee range calculation part 2 uses an SBAS (Satellite Based Augmentation System) receiver disclosed in, for example, Japanese Patent Application Laid-Open No. 2010-234979 to calculate the maximum error of the distance in km calculated as described above, and calculates the GPS position guarantee range 103 in consideration of the maximum error.

Moreover, the GPS position guarantee range calculation part 2 holds an offset distance from an installation position of the GPS antenna 1 to the rear end of the train, and calculates a position guarantee range of the rear end of the train (referred to as a "GPS rear-end-position guarantee range") by adding the offset distance to the GPS position guarantee range 103 (step S101).

Next, the tachogenerator-position guarantee range calculation part 4 obtains the wheel rotation number signal 104 from the tachometer generator 3, and multiplies the number of rotations of the wheels by a wheel circumference length of the train to calculate a travel distance. The wheel circumferential length is held by, for example, the tachogenerator-position guarantee range calculation part 4. Subsequently, a distance in km is calculated based on a travel distance from a specific starting point such as a traveling starting position with the railway line information 102 used as constraint conditions. Subsequently, the tachogenerator-position guarantee range calculation part 4 calculates the maximum error of the distance in km based on measurements by the tachometer generator 3 by using a method indicated in No. 144-1 (pages 2 to 12) of collected papers of lectures by the Japan Society of Mechanical Engineers, and calculates the tachogenerator-position guarantee range 105 in consideration of the maximum error.

In addition, the tachogenerator-position guarantee range calculation part 4 holds an offset distance from the measured axle mounted with the tachometer generator 3 to the rear end of the train, and calculates a position guarantee range of the rear end of the train (referred to as a "tachogenerator rear-end-position guarantee range") by adding the offset distance to the tachogenerator-position guarantee range 105 (step S102).

Next, the guarantee range comparing part 6 performs comparison processing of comparing the GPS position guarantee range 103 with the tachogenerator-position guarantee range 105. More specifically, first of all, a determination is made as to whether or not the GPS rear-end-position guarantee range and the tachogenerator rear-end-position guarantee range overlap each other (step S103).

When both of the ranges overlap each other, the guarantee range comparing part 6 determines whether or not a train-forward-traveling-direction rear end value (hereinafter referred to as a "GPS rear-end-position guarantee range−") of the GPS rear-end-position guarantee range is located more rearward than a train-forward-traveling-direction rear end value (hereinafter referred to as a "tachogenerator rear-end-position guarantee range−") of the tachogenerator rear-end-position guarantee range in a train forward traveling direction (step S104).

Figure 3:
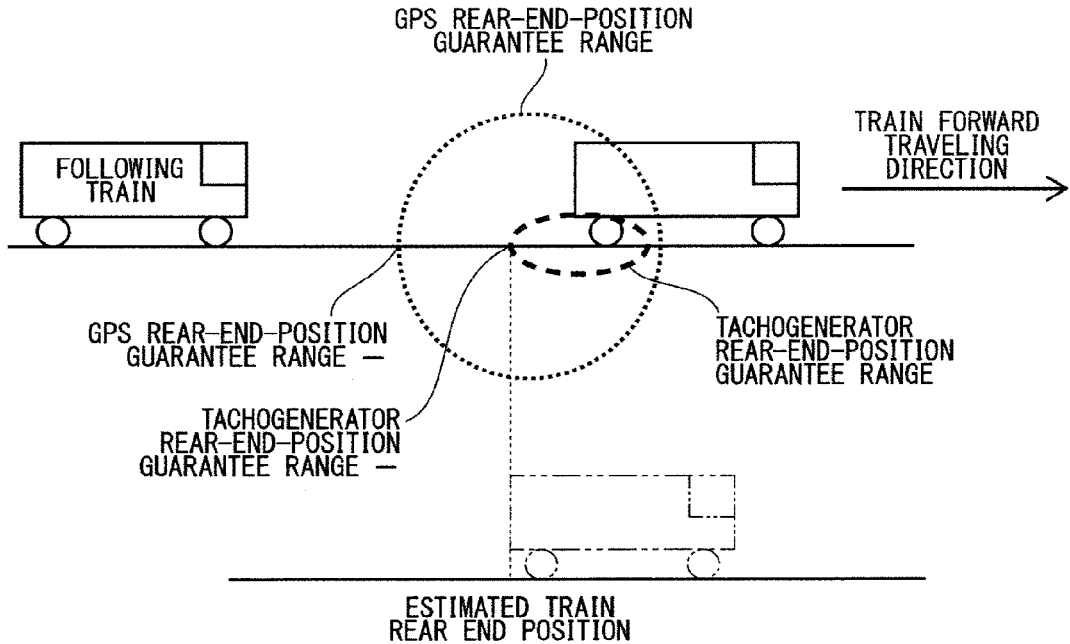
FIG. 3 is a diagram illustrating train position detection by the train position detecting device according to the first embodiment.
Figure 4:
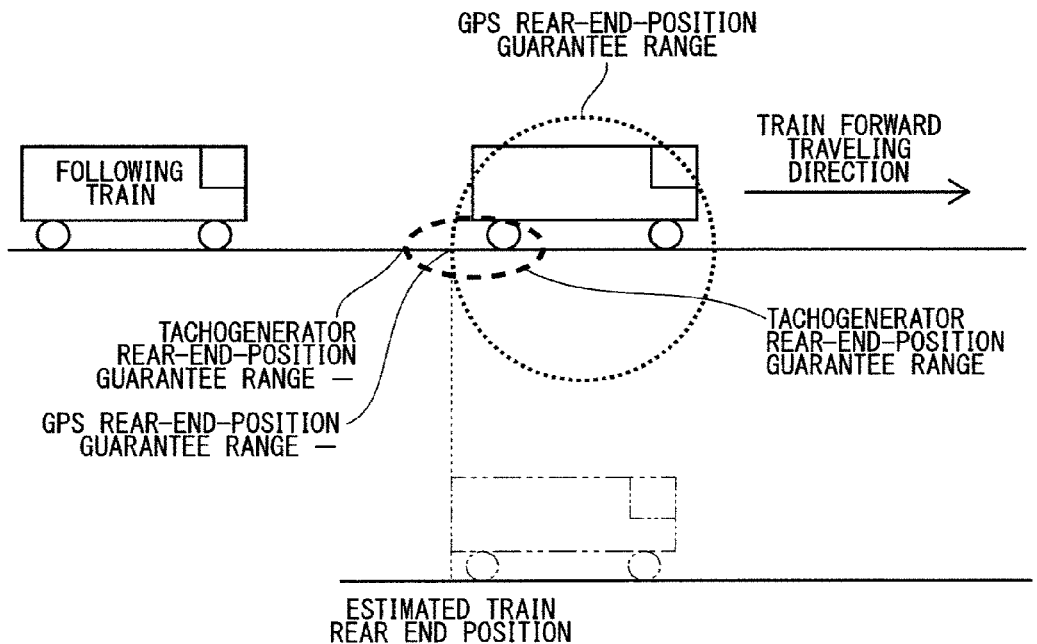
FIG. 4 is a diagram illustrating train position detection by the train position detecting device according to the first embodiment.

FIG. 3 shows a case where the GPS rear-end-position guarantee range− is located more rearward than the tachogenerator rear-end-position guarantee range− in the train forward traveling direction. In this case, the tachogenerator rear-end-position guarantee range− is set as the estimated train rear end position (step S105 in FIG. 2). Meanwhile, FIG. 4 shows a case where the GPS rear-end-position guarantee range− is located more forward than the tachogenerator rear-end-position guarantee range− in the train forward traveling direction. In this case, the GPS rear-end-position guarantee range− is set as the estimated train rear end position (step S106 in FIG. 2). In addition, even when the GPS rear-end-position guarantee range− and the tachogenerator rear-end-position guarantee range− are located at the same position, the GPS rear-end-position guarantee range− is set as the estimated train rear end position (step S106 in FIG. 2).

That is, the estimated train rear end position is a rearmost end position of a range in which the GPS rear-end-position guarantee range and the tachogenerator rear-end-position guarantee range overlap each other. In other words, between the end part (the GPS rear-end-position guarantee range−) of the GPS rear-end-position guarantee range in a train backward traveling direction and the end part (the tachogenerator rear-end-position guarantee range−) of the tachogenerator rear-end-position guarantee range in the train backward traveling direction, a position of the end part on the positive side of the train forward traveling direction is set as the estimated train rear end position. As a result, a positioning error at the rear end position of the train is shortened, thereby enabling to realize high-density operation in which an interval between the own train and the following train is shortened.

When the GPS rear-end-position guarantee range and the tachogenerator rear-end-position guarantee range do not overlap each other (step S103 in FIG. 2: NO), it is considered that an idling slip causes a large deviation between the true train position and the train position measured by the tachometer generator 3. Accordingly, the GPS rear-end-position guarantee range− is set as the estimated train rear end position (step S106 in FIG. 2).

<A-3. Modified Example>

In an area in which signals from GPS satellites cannot be received (hereinafter referred to as an "area out of GPS range"), for example, in a tunnel, the GPS position guarantee range cannot be calculated. Accordingly, the guarantee range comparing part 6 holds position information of the area out of GPS range, and while the estimated train rear end position is located in the area out of GPS range, the tachogenerator rear-end-position guarantee range− may be exclusively set as the estimated train rear end position.

In addition, the positioning by GPS signals is performed as the absolute-position positioning method, and the positioning by the tachometer generator 3 is performed as the relative-position positioning method. However, these positionings are examples of the respective positioning methods, and therefore other positioning methods may be used. For example, other satellite positioning methods may be used as the absolute-position positioning method, and other accumulated mileage meters such as an encoder may be used as the relative-position positioning method.

In addition, the GPS position guarantee range calculation part 2 and the tachogenerator-position guarantee range calculation part 4 treat a train position as a distance in km on a route. However, the train position may be treated as latitude/longitude.

Moreover, the GPS position guarantee range calculation part 2 holds an offset distance from the installation position of the GPS antenna 1 to the rear end of the train. However, the offset distance may be held by the railway line information storage part 5.

Further, the tachogenerator-position guarantee range calculation part 4 holds an offset distance from the measured axle mounted with the tachometer generator to the rear end of the train. However, the offset distance may be held by the railway line information storage part 5.

Further, the tachometer generator 3 and the GPS antenna 1 have been described as components of the train position detecting device 100A. However, these components are disposed outside the train position detecting device 100A. The train position detecting device 100A may be configured to obtain signals from these components.

Furthermore, in FIG. 2, the GPS rear-end-position guarantee range is calculated (step S101), and thereafter, the tachogenerator rear-end-position guarantee range is calculated (step S102). However, steps S101 and 102 may be in any order.

<A-4. Effects>

In the train position detecting device 100A according to the first embodiment, the GPS position guarantee range (the absolute position guarantee range) includes the GPS rear-end-position guarantee range (the absolute rear-end-position guarantee range), which is an estimated range of the position of the rear end part of the train, the tachogenerator-position guarantee range (the relative position guarantee range) includes the tachogenerator rear-end-position guarantee range (the relative rear-end-position guarantee range), which is an estimated range of the position of the rear end part of the train, and the position determination part 7 determines, between the end part of the GPS rear-end-position guarantee range in the train backward traveling direction and the end part of the tachogenerator rear-end-position guarantee range in the train backward traveling direction, a position of the end part on the positive side of the train forward traveling direction to be a position of the rear end part of the train. Therefore, a margin distance with respect to the following train can be further shortened than estimating the position of the rear end part of the train only based on the GPS position guarantee range or only based on the tachogenerator-position guarantee range. Therefore, a distance between train formations can be set short.

In the train position detecting device 100A according to the first embodiment, when the GPS rear-end-position guarantee range (the absolute rear-end-position guarantee range) and the tachogenerator rear-end-position guarantee range (the relative rear-end-position guarantee range) do not overlap each other, the position determination part 7 determines a position of the GPS rear-end-position guarantee range− (the end part of the absolute rear-end-position guarantee range in the train backward traveling direction) to be a position of the rear end part of the train. As a result, even when an idling slip or the like causes a large deviation between the true train position and the train position measured by the tachometer generator 3, a position of the rear end part of the train can be appropriately determined.

<B. Second Embodiment>

In a second embodiment of the present invention, processing for shortening a margin distance with respect to the front end position of the own train will be described. The processing enables to appropriately shorten a train interval with respect to a preceding train, and to enter a forward speed limit zone at an appropriate speed.

<B-1. Configuration>

A configuration of a train position detecting device according to the second embodiment is similar to that of the train position detecting device 100A in FIG. 1.

<B-2. Operation>

Figure 5:
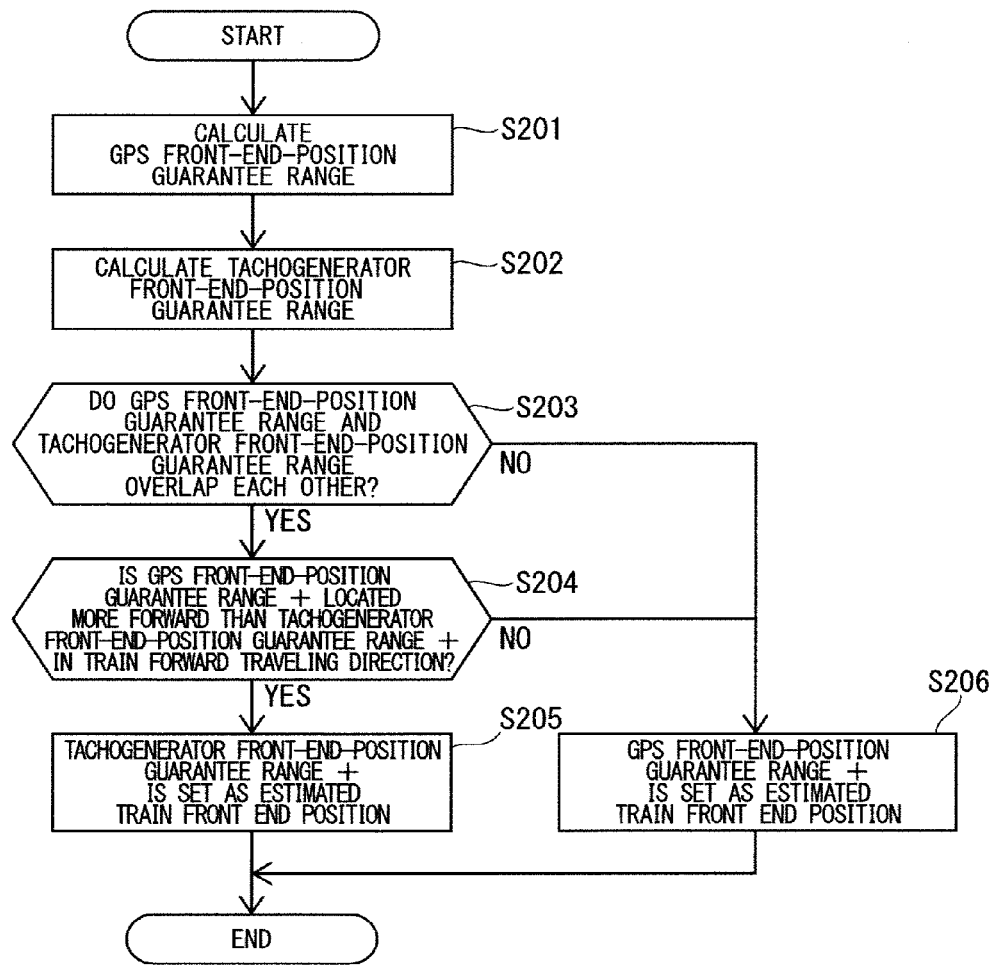
FIG. 5 is a flowchart illustrating an operation of a train position detecting device according to a second embodiment.

FIG. 5 is a flowchart illustrating an operation of the train position detecting device according to the second embodiment. The operation of the train position detecting device according to the second embodiment will be described below with reference to FIGS. 1 and 5.

The GPS position guarantee range calculation part 2 calculates the GPS position guarantee range 103 in a manner similar to the first embodiment. Moreover, the GPS position guarantee range calculation part 2 holds an offset distance from the installation position of the GPS antenna 1 to the front end of the train, and calculates a position guarantee range of the front end of the train (referred to as a "GPS front-end-position guarantee range") by adding the offset distance to the GPS position guarantee range 103 (step S201).

Next, the tachogenerator-position guarantee range calculation part 4 calculates the tachogenerator-position guarantee range 105 in a manner similar to the first embodiment. In addition, the tachogenerator-position guarantee range calculation part 4 holds an offset distance from the measured axle mounted with the tachometer generator 3 to the front end of the train, and calculates a position guarantee range of the front end of the train (referred to as a "tachogenerator front-end-position guarantee range") by adding the offset distance to the tachogenerator-position guarantee range 105 (step S202).

Next, the guarantee range comparing part 6 performs comparison processing of comparing the GPS position guarantee range 103 with the tachogenerator-position guarantee range 105. More specifically, first of all, a determination is made as to whether or not the GPS front-end-position guarantee range and the tachogenerator front-end-position guarantee range overlap each other (step S203).

When both of the ranges overlap each other, the guarantee range comparing part 6 determines whether or not a train-forward-traveling-direction front end value (hereinafter referred to as a "GPS front-end-position guarantee range+") of the GPS front-end-position guarantee range is located more rearward than a train-forward-traveling-direction front end value (hereinafter referred to as a "tachogenerator front-end-position guarantee range+") of the tachogenerator front-end-position guarantee range in a train forward traveling direction (step S204).

Figure 6:
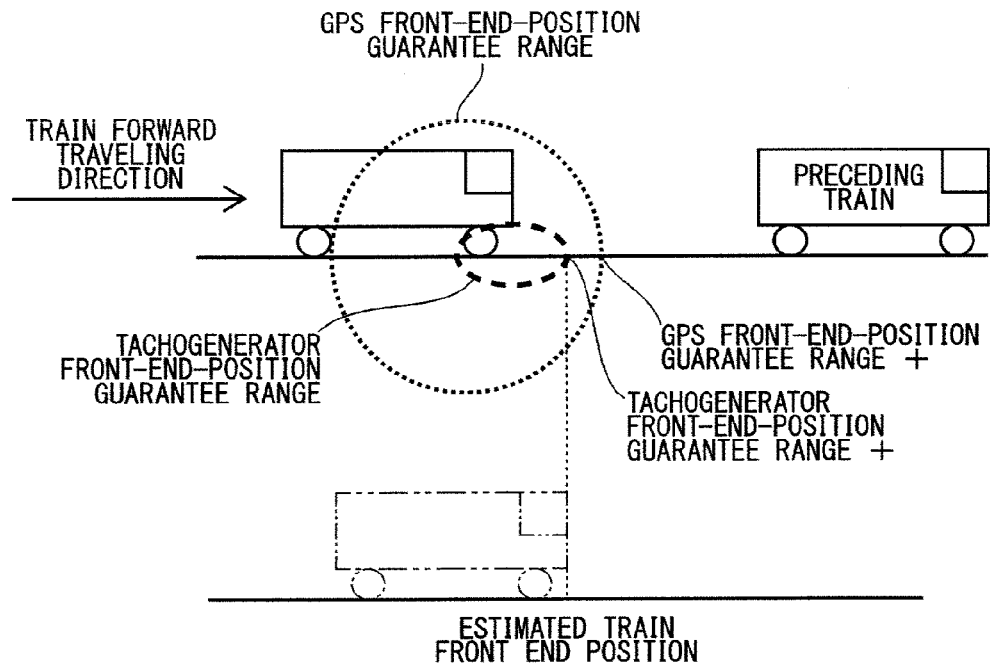
FIG. 6 is a diagram illustrating train position detection by the train position detecting device according to the second embodiment.
Figure 7:
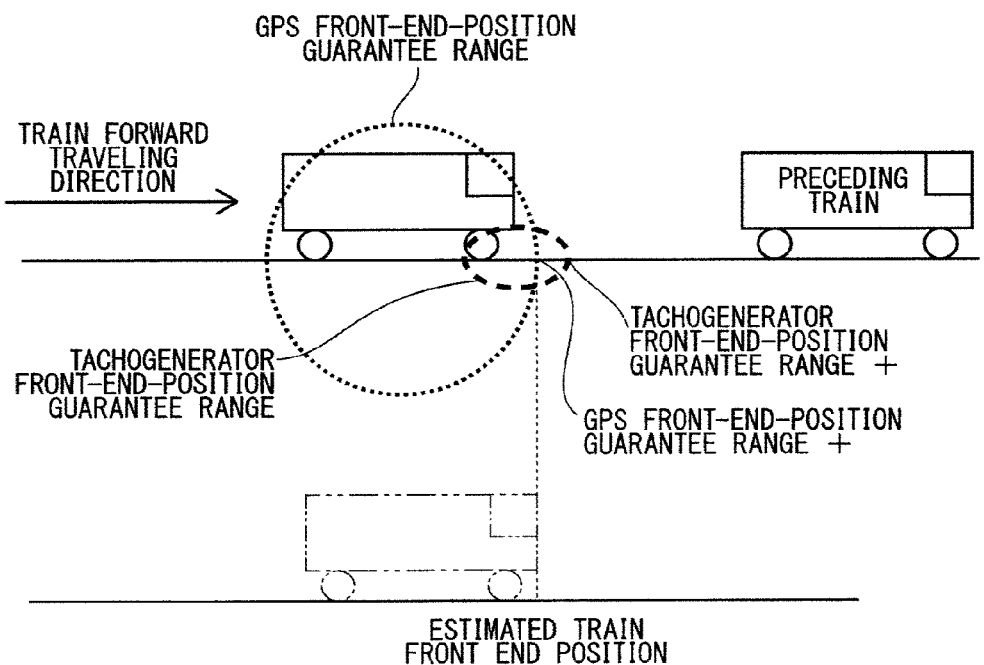
FIG. 7 is a diagram illustrating train position detection by the train position detecting device according to the second embodiment.

FIG. 6 shows a case where the GPS front-end-position guarantee range+ is located more forward than the tachogenerator front-end-position guarantee range+ in the train forward traveling direction. In this case, the tachogenerator front-end-position guarantee range+ is set as an estimated train front end position (step S205 in FIG. 5). Meanwhile, FIG. 7 shows a case where the GPS front-end-position guarantee range+ is located more rearward than the tachogenerator front-end-position guarantee range+ in the train forward traveling direction. In this case, the GPS front-end-position guarantee range+ is set as the estimated train front end position (step S206 in FIG. 5). In addition, even when the GPS front-end-position guarantee range+ and the tachogenerator front-end-position guarantee range+ are located at the same position, the GPS front-end-position guarantee range+ is set as the estimated train front end position (step S206 in FIG. 5).

That is, the estimated train front end position is a frontmost end position of a range in which the GPS front-end-position guarantee range and the tachogenerator front-end-position guarantee range overlap each other. As a result, a positioning error at the front end position of the train is decreased, thereby enabling to realize the high-density operation in which an interval between the own train and the preceding train is shortened.

When the GPS front-end-position guarantee range+ and the tachogenerator front-end-position guarantee range+ do not overlap each other (step S203 in FIG. 5: NO), it is considered that an idling slip causes a large deviation between the true train position and the train position measured by the tachometer generator 3. Accordingly, the GPS front-end-position guarantee range+ is set as the estimated train front end position (step S206 in FIG. 5).

<B-3. Modified Example>

The guarantee range comparing part 6 holds position information of the area out of GPS range, and while the estimated train front end position is located in the area out of GPS range, the tachogenerator front-end-position guarantee range+ may be exclusively set as the estimated train front end position.

In addition, the GPS position guarantee range calculation part 2 holds an offset distance from the installation position of the GPS antenna 1 to the front end of the train. However, the offset distance may be held by the railway line information storage part 5.

Moreover, the tachogenerator-position guarantee range calculation part 4 holds an offset distance from the measured axle mounted with the tachometer generator to the front end of the train. However, the offset distance may be held by the railway line information storage part 5.

Furthermore, in FIG. 5, the GPS front-end-position guarantee range is calculated (step S201), and thereafter, the tachogenerator front-end-position guarantee range is calculated (step S202). However, steps S201 and 202 may be in any order.

Besides the above, a modified example similar to that of the first embodiment is also applied to the second embodiment.

<B-4. Effects>

In accordance with the train position detecting device according to the second embodiment, the GPS position guarantee range (the absolute position guarantee range) includes the GPS front-end-position guarantee range (the absolute front-end-position guarantee range), which is an estimated range of the position of the front end part of the train, the tachogenerator-position guarantee range (the relative position guarantee range) includes the tachogenerator front-end-position guarantee range (the relative front-end-position guarantee range), which is an estimated range of the position of the front end part of the train, and the position determination part 7 determines, between the end part of the absolute front-end-position guarantee range in the train forward traveling direction and the end part of the relative front-end-position guarantee range in the train forward traveling direction, a position of the end part on the positive side of the train backward traveling direction to be a position of the front end part of the train. Therefore, a margin distance with respect to the preceding train can be further shortened than estimating the position of the front end part of the train only based on the GPS position guarantee range or only based on the tachogenerator-position guarantee range. Therefore, a distance between train formations can be set short.

When the GPS front-end-position guarantee range (the absolute front-end-position guarantee range) and the tachogenerator front-end-position guarantee range (the relative front-end-position guarantee range) do not overlap each other, the position determination part determines the GPS front-end-position guarantee range+ (the position of the end part of the absolute front-end-position guarantee range in the train forward traveling direction) to be a position of the front end part of the train. As a result, even when an idling slip or the like causes a large deviation between the true train position and the train position measured by the tachometer generator 3, a position of the front end part of the train can be appropriately determined.

<C. Third Embodiment>

In a third embodiment of the present invention, in addition to the processing in the first embodiment, positioning results in the past are further referred to, thereby performing processing to further shorten a margin distance.

<C-1. Configuration>

Figure 8:
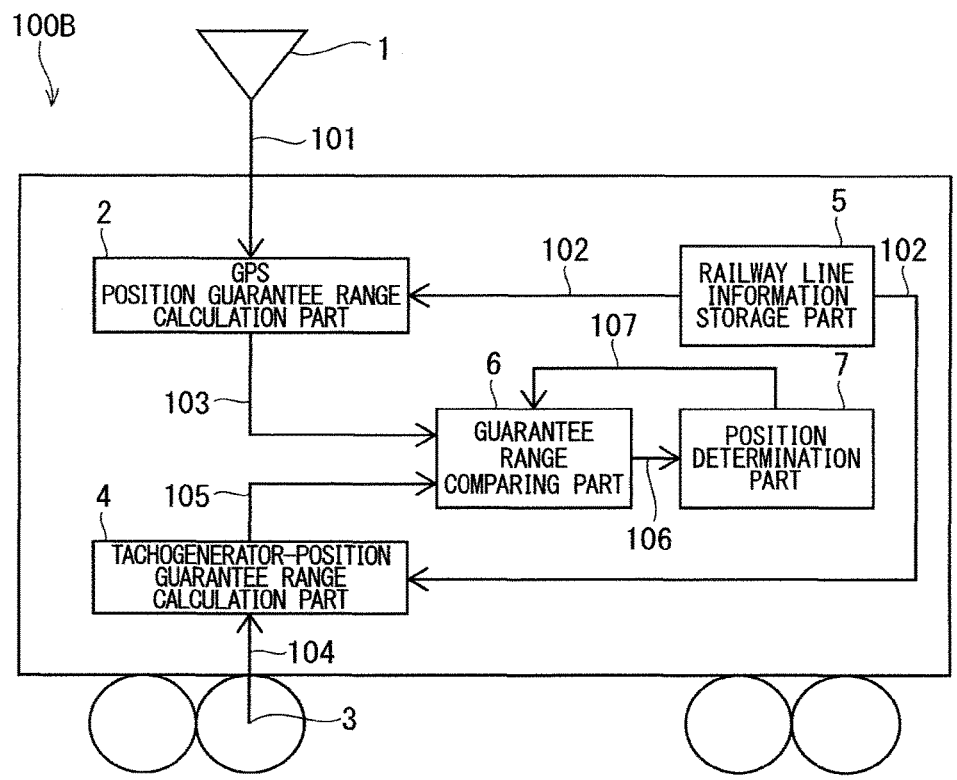
FIG. 8 is a block diagram illustrating a configuration of a train position detecting device according to a third embodiment.

FIG. 8 is a diagram illustrating a configuration of a train position detecting device 100B according to the third embodiment. A configuration of the train position detecting device 100B is similar to that of the train position detecting device 100A according to the first embodiment except that an estimated train rear end position 107 is output from the position determination part 7 to the guarantee range comparing part 6.

<C-2. Operation>

Figure 9:
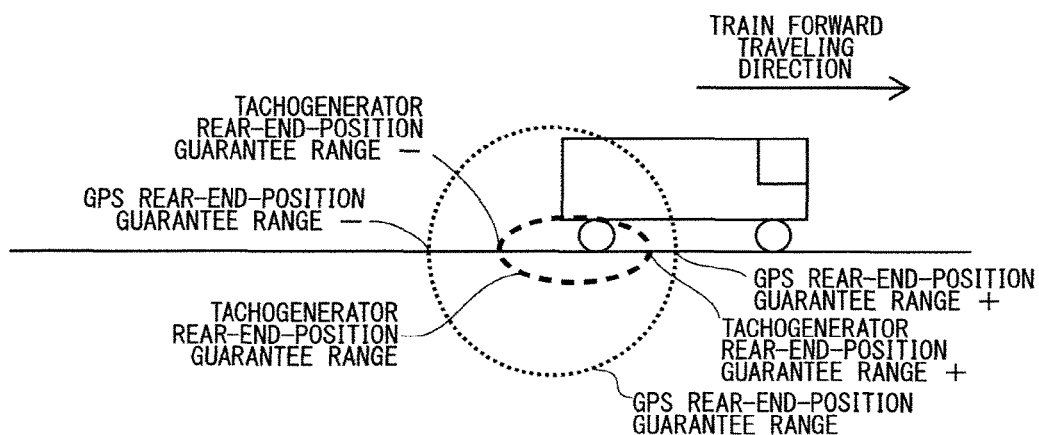
FIG. 9 is a diagram illustrating a position guarantee range.

Terms related to the rear-end-position guarantee range will be described with reference to FIG. 9. The tachogenerator rear-end-position guarantee range+ is a front end value of the tachogenerator rear-end-position guarantee range in the train forward traveling direction, and a rear end position of the train at the time of starting traveling is set as an initial value. The tachogenerator rear-end-position guarantee range− is synonymous with that of the first embodiment, and represents a rear end value of the tachogenerator rear-end-position guarantee range in the train forward traveling direction. A rear end position of the train at the time of starting traveling is set as an initial value.

The GPS rear-end-position guarantee range is synonymous with that of the first embodiment, and represents a GPS position guarantee range at the rear end position of the own train. The GPS rear-end-position guarantee range+ represents a front end value of the GPS rear-end-position guarantee range in the train forward traveling direction. The GPS rear-end-position guarantee range− is synonymous with that of the first embodiment, and represents a rear end value of the GPS rear-end-position guarantee range in the train forward traveling direction.

FIG. 10 shows a transition of an estimated train rear end position determined by the position determination part 7 of the train position detecting device 100B. The horizontal axis indicates a true train position, and the vertical axis indicates a measured train position. In addition, it is assumed that a detection cycle during which a train position is detected by the GPS signals 101 is longer than a detection cycle during which a train position is detected by the tachometer generator 3.

Figure 11:
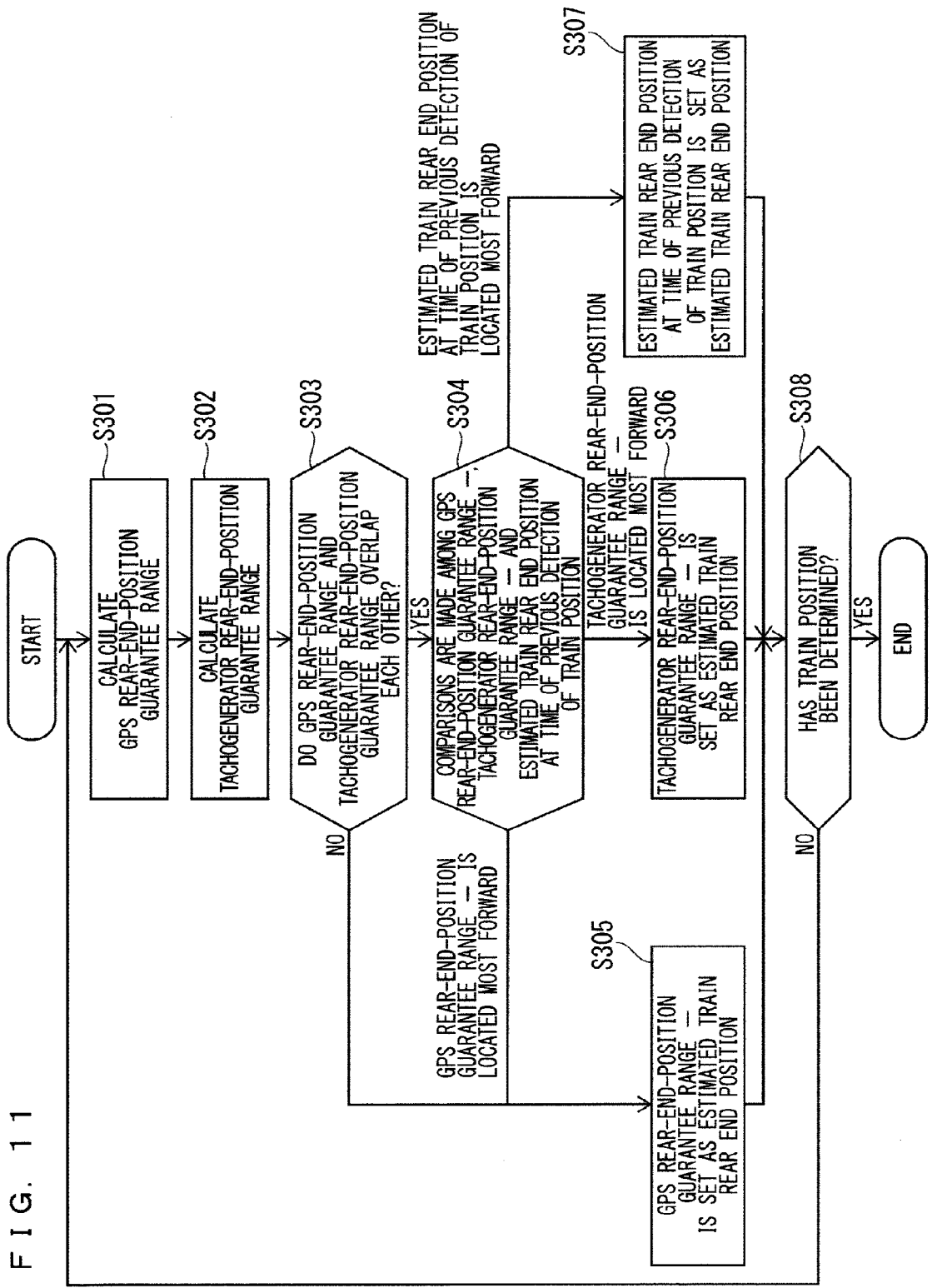
FIG. 11 is a flowchart illustrating an operation of the train position detecting device according to the third embodiment.

FIG. 11 is a flowchart illustrating an operation of the train position detecting device 100B. The operation of the train position detecting device 100B will be described below with reference to FIGS. 10 and 11.

First of all, the GPS position guarantee range calculation part 2 calculates the GPS rear-end-position guarantee range (step S301), and the tachogenerator-position guarantee range calculation part 4 calculates the tachogenerator rear-end-position guarantee range (step S302).

Next, the guarantee range comparing part 6 performs comparison processing of comparing the GPS rear-end-position guarantee range with the tachogenerator rear-end-position guarantee range. More specifically, first of all, a determination is made as to whether or not the GPS rear-end-position guarantee range and the tachogenerator rear-end-position guarantee range overlap each other (step S303). Steps S301 to S303 are similar to steps S101 to S103 in FIG. 2 described in the first embodiment.

When the GPS rear-end-position guarantee range and the tachogenerator rear-end-position guarantee range overlap each other, comparisons are made among the GPS rear-end-position guarantee range–, the tachogenerator rear-end-position guarantee –, and the estimated train rear end position at the time of previous detection of the train position (step S304). It should be noted that the estimated train rear end position at the time of previous detection of the train position is obtained from the position determination part 7 by the guarantee range comparing part 6.

As a result of the comparisons, one located most forward in the train forward traveling direction is set as the estimated train rear end position. More specifically, when the GPS rear-end-position guarantee range– is located most forward, the GPS rear-end-position guarantee range– is set as the estimated train rear end position (step S305); when the tachogenerator rear-end-position guarantee range– is located most forward, the tachogenerator rear-end-position guarantee range– is set as the estimated train rear end position (step S306); and when the estimated train rear end position at the time of previous detection of the train position is located most forward, the estimated train rear end position at the time of previous detection of the train position is set as the estimated train rear end position (step S307).

In other words, in the third embodiment, on the assumption that the train does not move back, even when the OPS rear-end-position guarantee range– or the tachogenerator rear-end-position guarantee range– is located more rearward than the previous estimated train rear end position in the train forward traveling direction, the previous estimated train rear end position is set as the current estimated train rear end position, thereby performing latch processing so as to prevent the estimated train rear end position from moving back.

Next, the position determination part 7 determines whether or not a train position has been confirmed (step S308). For example, when the train passes by the position correction track antenna, it can be determined that the train position has been confirmed. When the train position has not been confirmed, the process returns to step S301 again, and the determination of the estimated train rear end position is repeated.

It should be noted that at the time of starting processing, "the estimated train rear end position at the time of previous detection of the train position" is a rear end position of the train at the time of starting traveling.

As a result of the above-described operation, since the estimated train rear end position does not move back to the negative side of the train forward traveling direction, a positioning error at the rear end position of the train is further shortened than that of the first embodiment. Therefore, the train can be run with the interval between the own train and the following train shortened. That is, the high-density operation can be realized.

When the GPS rear-end-position guarantee range and the tachogenerator rear-end-position guarantee range do not overlap each other (step S303: NO), it is considered that an idling slip causes a large deviation between the true train position and the train position measured by the tachometer generator 3. Accordingly, the GPS rear end position guarantee range – is set as the estimated train rear end position (step S305 in FIG. 11).

<C-3. Effects>

In the train position detecting device 100B according to the third embodiment, when a position of the rear end part of the train, which has been previously determined, is more on the positive side of the train forward traveling direction than the end part that is on the positive side of the train forward traveling direction, between the end part of the GPS rear-end-position guarantee range (the absolute rear-end-position guarantee range) in the train backward traveling direction and the end part of the tachogenerator rear-end-position guarantee range (the relative rear-end-position guarantee range) in the train backward traveling direction, the position determination part 7 determines the position of the rear end part of the train, which has been previously determined, to be a current rear end position of the train. Therefore, since the estimated train rear end position does not move back to the negative side of the train forward traveling direction, a margin distance at the rear end position of the train is further shortened than that of the first embodiment. Accordingly, a margin distance with respect to the following train can be shortened. Therefore, a distance between train formations can be set short.

<D. Fourth Embodiment>

In the third embodiment, the margin distance has been shortened by referring to the positioning results in the past. However, in a fourth embodiment, a margin distance with respect to the following train is further shortened by using the estimated train rear end position as an initial value of the relative distance measurement.

<D-1. Configuration>

FIG. 12 is a diagram illustrating a configuration of a train position detecting device 100C according to the fourth embodiment. A configuration of the train position detecting device 100C is similar to that of the train position detecting device 100A according to the first embodiment except that an estimated train rear end position 108 is output from the position determination part 7 to the tachogenerator-position guarantee range calculation part 4.

<D-2. Operation>

FIG. 13 shows a transition of an estimated train rear end position determined by the position determination part 7 of the train position detecting device 100C. The horizontal axis indicates a true train position, and the vertical axis indicates a measured train position. In addition, it is assumed that a detection cycle during which a train position is detected by the GPS signals 101 is longer than a detection cycle during which a train position is detected by the tachometer generator 3.

Figure 14:
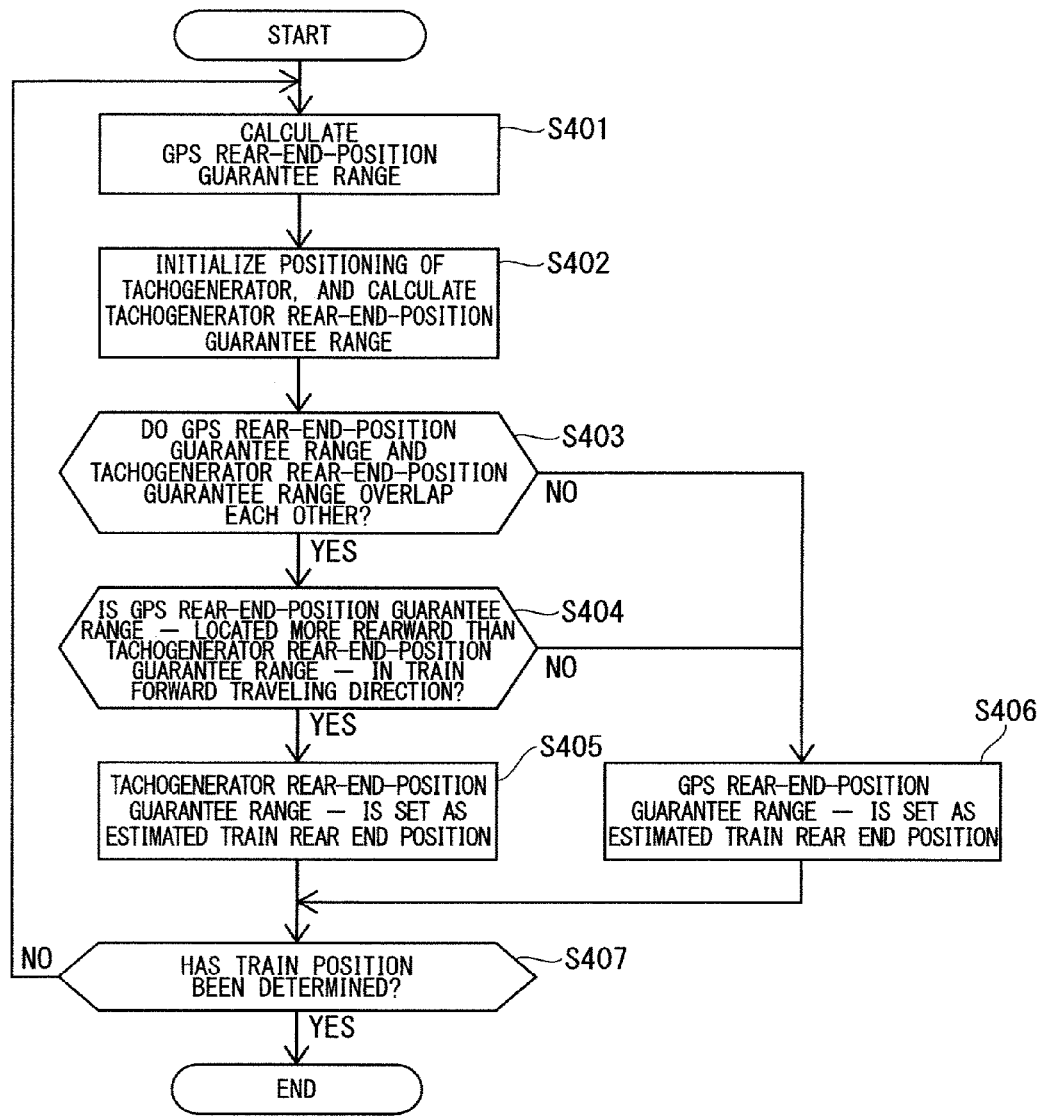
FIG. 14 is a flowchart illustrating an operation of the train position detecting device according to the fourth embodiment.

FIG. 14 is a flowchart illustrating an operation of the train position detecting device 100C. The operation of the train position detecting device 100C will be described below with reference to FIGS. 13 and 14.

First of all, the GPS position guarantee range calculation part 2 calculates the GPS rear-end-position guarantee range (step S401). This step is similar to step S101 in FIG. 2 described in the first embodiment.

Next, the tachogenerator-position guarantee range calculation part 4 calculates the tachogenerator rear-end-position guarantee range by using the estimated train rear end position 108 obtained from the position determination part 7 as an initial value of the tachogenerator rear-end-position guarantee range − (hereinafter this processing is referred to as "initialization of positioning by the tachogenerator" in the present embodiment) (step S402). More specifically, a travel distance measured by the tachometer generator 3 and a positioning error thereof are accumulated to the initial value of the tachogenerator rear-end-position guarantee range−. FIG. 13 shows this accumulated value as an "updated tachogenerator rear-end-position guarantee range−". In other words, in the fourth embodiment, the tachogenerator rear-end-position guarantee range− is updated on the assumption that the train does not move back.

Next, the guarantee range comparing part 6 performs comparison processing of comparing the GPS rear-end-position guarantee range− with the tachogenerator rear-end-position guarantee range−. More specifically, first of all, a determination is made as to whether or not the GPS rear-end-position guarantee range and the tachogenerator rear-end-position guarantee range overlap each other (step S403). This step is similar to step S103 in FIG. 2 described in the first embodiment.

When the GPS rear-end-position guarantee range and the tachogenerator rear-end-position guarantee range overlap each other, the guarantee range comparing part 6 compares the GPS rear-end-position guarantee range− with the tachogenerator rear-end-position guarantee range− (step S404), and the position determination part 7 determines the estimated train rear end position based on the comparison result (steps S405 and 406). Steps S404 to 406 are similar to steps S104 to 106 in FIG. 2 described in the first embodiment, and therefore a detailed description thereof will be omitted herein.

Next, the position determination part 7 determines whether or not a train position has been determined (step S407). For example, when the train passes by the position correction track antenna, it can be determined that the train position has been confirmed. When the train position has not been confirmed, the process returns to step S401 again, and the determination of the estimated train rear end position is repeated.

Incidentally, at the time of starting processing, initialization of positioning by the tachogenerator is conducted by using a rear end position of the train at the time of starting traveling as an initial value of the tachogenerator rear-end-position guarantee range−.

As a result of the above-described operation, the estimated train rear end position does not move back to the negative side of the train forward traveling direction, and a positioning error at the rear end position of the train is further shortened than that of the third embodiment. Therefore, the high-density operation can be realized with the interval between the own train and the following train shortened than that of the third embodiment.

<D-3. Effects>

In the train position detecting device 100C according to the fourth embodiment, the tachogenerator-position guarantee range calculation part 4 (a relative position guarantee range calculation part) accumulates a newly measured value by the tachometer generator 3 and a measurement error thereof to a tachogenerator rear-end-position guarantee-range initial value (a relative rear-end-position guarantee-range initial value), which is the tachogenerator rear-end-position guarantee range (the relative rear-end-position guarantee range) calculated based on the measurement result previously obtained by the tachometer generator 3 (a relative distance measurement sensor), to calculate a relative rear-end-position guarantee range, and when the end part of the relative rear-end-position guarantee-range initial value in the train backward traveling direction is more on the negative side of the train forward traveling direction than the position of the rear end part of the train previously determined by the position determination part 7, calculates the relative rear-end-position guarantee range by using, as the relative rear-end-position guarantee-range initial value, the position of the rear end part of the train previously determined by the position determination part. Therefore, the estimated train rear end position does not move back to the negative side of the train forward traveling direction, and a positioning error at the rear end position of the train is further shortened than that of the third embodiment. Therefore, the high-density operation can be realized with the interval between the own train and the following train shortened than that of the third embodiment.

<E. Fifth Embodiment>

In the fifth embodiment, a margin distance with respect to the preceding train is shortened by using the estimated train front end position as an initial value of the relative distance measurement.

<E-1. Configuration>

Figure 15:
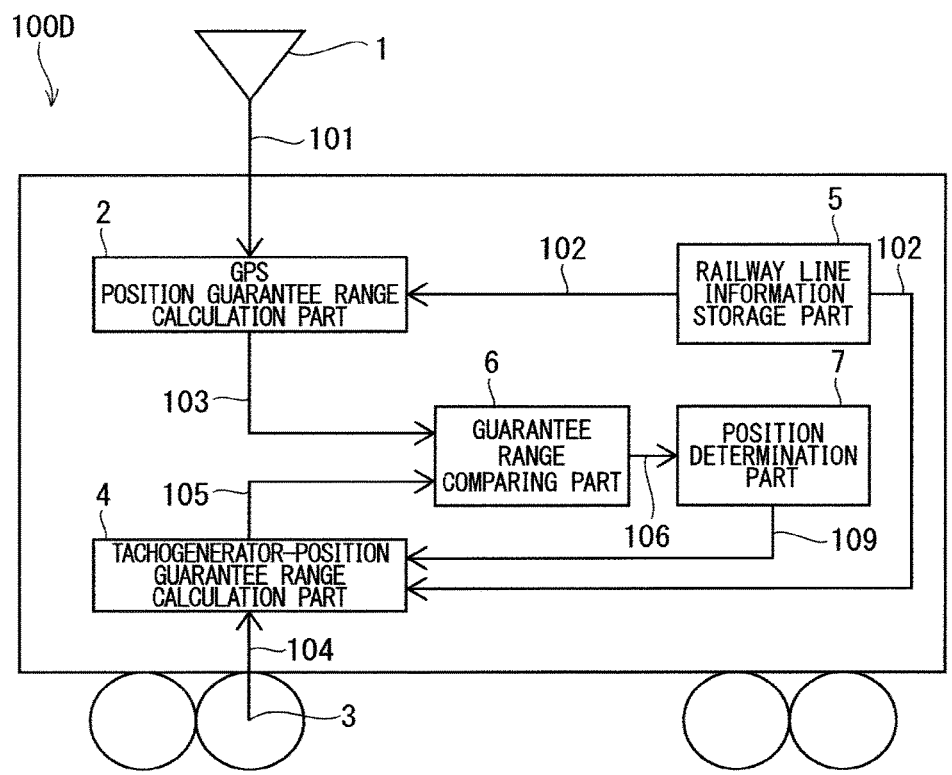
FIG. 15 is a block diagram illustrating a configuration of a train position detecting device according to a fifth embodiment.

FIG. 15 is a diagram illustrating a configuration of a train position detecting device 100D according to the fifth embodiment. The configuration of the train position detecting device 100D is similar to that of the train position detecting device according to the second embodiment except that an estimated train front end position 109 is output from the position determination part 7 to the tachogenerator-position guarantee range calculation part 4.

<E-2. Operation>

Figure 16:
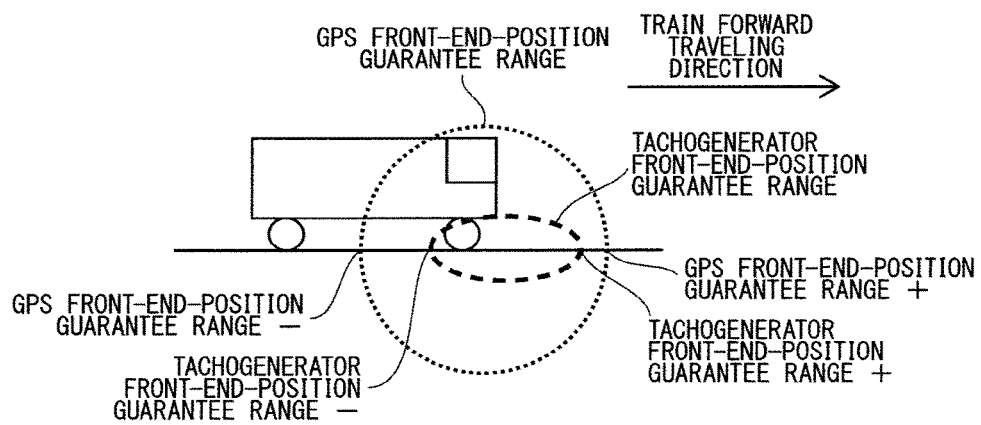
FIG. 16 is a diagram illustrating a position guarantee range.

Terms related to the front-end-position guarantee range will be described with reference to FIG. 16. The tachogenerator front-end-position guarantee range+ is synonymous with that of the second embodiment, and represents a train-forward-traveling-direction front end value of the tachogenerator front-end-position guarantee range. A front end position of the train at the time of starting traveling is set as an initial value. The tachogenerator front-end-position guarantee range− represents a train-forward-traveling-direction rear end value of the tachogenerator front-end-position guarantee range, and a front end position of the train at the time of starting traveling is set an initial value.

The GPS front-end-position guarantee range is synonymous with that of the second embodiment, and represents a GPS position guarantee range at the front end position of the own train. The GPS front-end-position guarantee range+ is synonymous with that of the second embodiment, and represents a front end value of the GPS front-end-position guarantee range in the train forward traveling direction. The GPS front-end-position guarantee range− represents a rear end value of the GPS front-end-position guarantee range in the train forward traveling direction.

Figure 17:
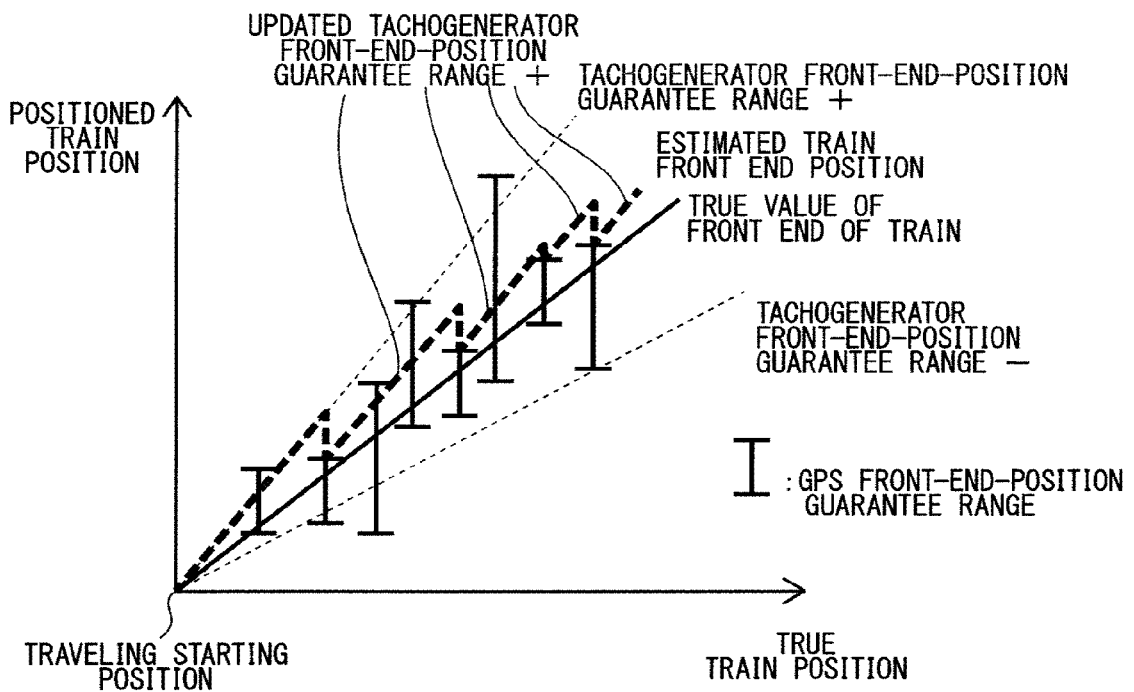
FIG. 17 is a chart illustrating a transition of an estimated train front end position by the train position detecting device according to the fifth embodiment.

FIG. 17 shows a transition of an estimated train front end position determined by the position determination part 7 of the train position detecting device 100D. The horizontal axis indicates a true train position, and the vertical axis indicates a measured train position. In addition, it is assumed that a detection cycle during which a train position is detected by the GPS signals 101 is longer than a detection cycle during which a train position is detected by the tachometer generator 3.

FIG. 18 is a flowchart illustrating an operation of the train position detecting device 100D. The operation of the train position detecting device 100D will be described below with reference to FIGS. 17 and 18.

First of all, the GPS position guarantee range calculation part 2 calculates the GPS front-end-position guarantee range (step S501). This step is similar to step S201 in FIG. 5 described in the second embodiment.

Next, the tachogenerator-position guarantee range calculation part 4 calculates the tachogenerator front-end-position guarantee range by using the estimated train front end position 109 obtained from the position determination part 7 as an initial value of the tachogenerator position front-end-position guarantee range+ (hereinafter this processing is referred to as "initialization of positioning by the tachogenerator" in the present embodiment) (step S502). More specifically, a travel distance measured by the tachometer generator 3 and a positioning error thereof are accumulated to an initial value of the tachogenerator position front-end-position guarantee range+. FIG. 17 shows this accumulated value as an "updated tachogenerator front-end-position guarantee range+". Updating the tachogenerator front-end-position guarantee range+ in this manner prevents the tachogenerator front-end-position guarantee range+ from becoming larger than necessary.

Next, the guarantee range comparing part 6 performs comparison processing of comparing the GPS rear-end-position guarantee range+ with the tachogenerator rear-end-position guarantee range+. More specifically, first of all, a determination is made as to whether or not the GPS front-end-position guarantee range and the tachogenerator front-end-position guarantee range overlap each other (step S503). This step is similar to step S203 in FIG. 5 described in the second embodiment.

When the GPS front-end-position guarantee range and the tachogenerator front-end-position guarantee range overlap each other, the guarantee range comparing part 6 compares the GPS front-end-position guarantee range+ with the tachogenerator front-end-position guarantee range+ (step S504), and the position determination part 7 determines the estimated train front end position based on the comparison result (steps S505 and 506). Steps S504 to 506 are similar to steps S204 to 206 in FIG. 5 described in the second embodiment, and therefore a detailed description thereof will be omitted here.

Next, the position determination part 7 determines whether or not a train position has been confirmed (step S507). For example, when the train passes by the position correction track antenna, it can be determined that the train position has been confirmed. When the train position has not been confirmed, the process returns to step S501 again, and the determination of the estimated train front end position is repeated.

Incidentally, at the time of starting processing, initialization of positioning by the tachogenerator is conducted by using a front end position of the train at the time of starting traveling as an initial value of the tachogenerator front-end-position guarantee range+.

As a result of the above-described operation, the estimated train front end position does not move more forward than the tachogenerator front-end-position guarantee range+ in the train forward traveling direction, and therefore the high-density operation can be realized with the interval between the preceding train and the own train shortened than that of the second embodiment.

<E-3. Effects>

In accordance with the train position detecting device 100D according to the fifth embodiment, the tachogenerator-position guarantee range calculation part 4 (the relative position guarantee range calculation part) accumulates a newly measured value by the tachometer generator 3 (the relative distance measurement sensor) and a measurement error thereof to a tachogenerator front-end-position guarantee-range initial value (a relative front-end-position guarantee-range initial value), which is the tachogenerator front-end-position guarantee range (the relative front-end-position guarantee range) calculated based on the measurement result previously obtained by the tachometer generator 3 (the relative distance measurement sensor), to calculate a tachogenerator front-end-position guarantee range (a relative front-end-position guarantee range), and when the end part of the tachogenerator front-end-position guarantee-range initial value (the relative front-end-position guarantee-range initial value) in the train forward traveling direction is more on the positive side of the train forward traveling direction than the position of the front end part of the train previously determined by the position determination part 7, calculates the relative front-end-position guarantee range by using, as the relative front-end-position guarantee-range initial value, the position of the front end part of the train previously determined by the position determination part 7. Therefore, the estimated train front end position does not move more forward than the tachogenerator front-end-position guarantee range+ in the train forward traveling direction, and therefore the high-density operation can be realized with the interval between the preceding train and the own train shortened than that of the second embodiment.

<F. Sixth Embodiment>

In the sixth embodiment, using an acceleration sensor in addition to the processing of the first embodiment enables to increase estimated accuracy of a train position, and thereby to appropriately shorten an interval from the following train.

<F-1. Configuration>

Figure 19:
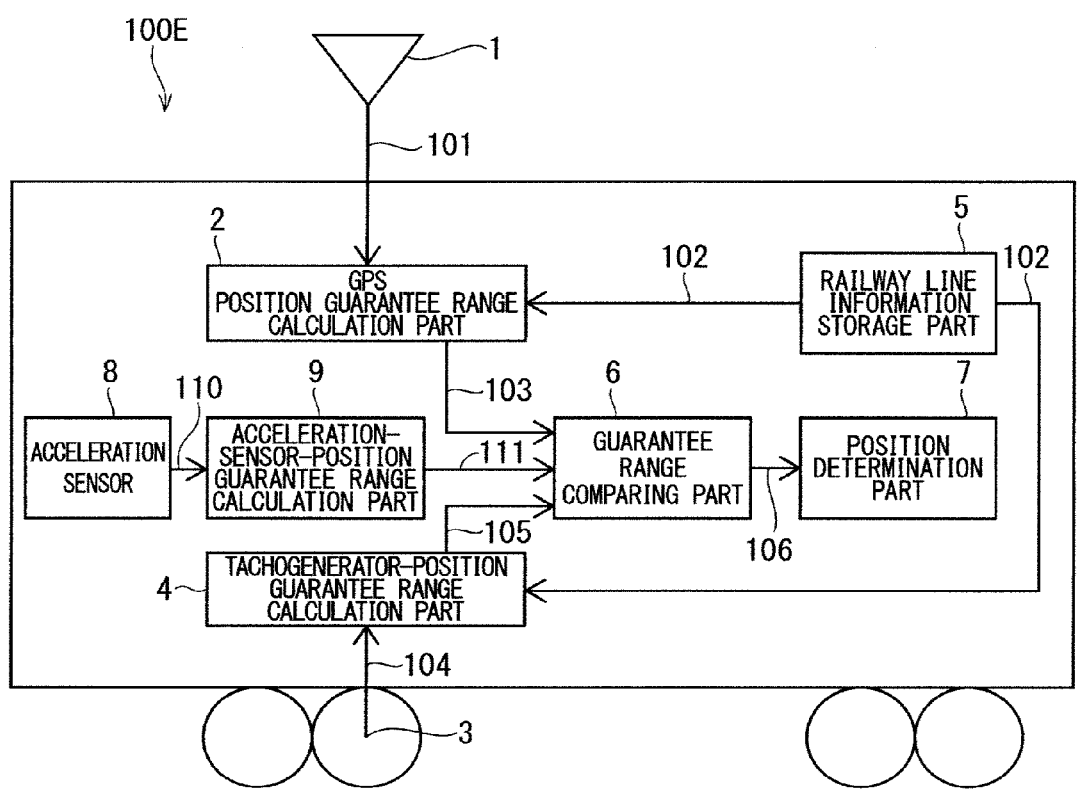
FIG. 19 is a block diagram illustrating a configuration of a train position detecting device according to a sixth embodiment.

FIG. 19 is a diagram illustrating a configuration of a train position detecting device 100E according to the sixth embodiment. In addition to the configuration of the train position detecting device 100A according to the first embodiment, the train position detecting device 100E is provided with an acceleration sensor 8 and an acceleration-sensor-position guarantee range calculation part 9.

The acceleration sensor 8 measures a train acceleration 110, and outputs the train acceleration 110 to the acceleration-sensor-position guarantee range calculation part 9.

The acceleration-sensor-position guarantee range calculation part 9 calculates an acceleration-sensor-position guarantee range 111 based on the train acceleration 110 measured by the acceleration sensor 8. The acceleration-sensor-position guarantee range 111 is a position range in which a train is present, the position range being estimated based on the train acceleration 110. The position "range" is used herein because a measurement error is taken into consideration.

<F-2. Operation>

Figure 20:
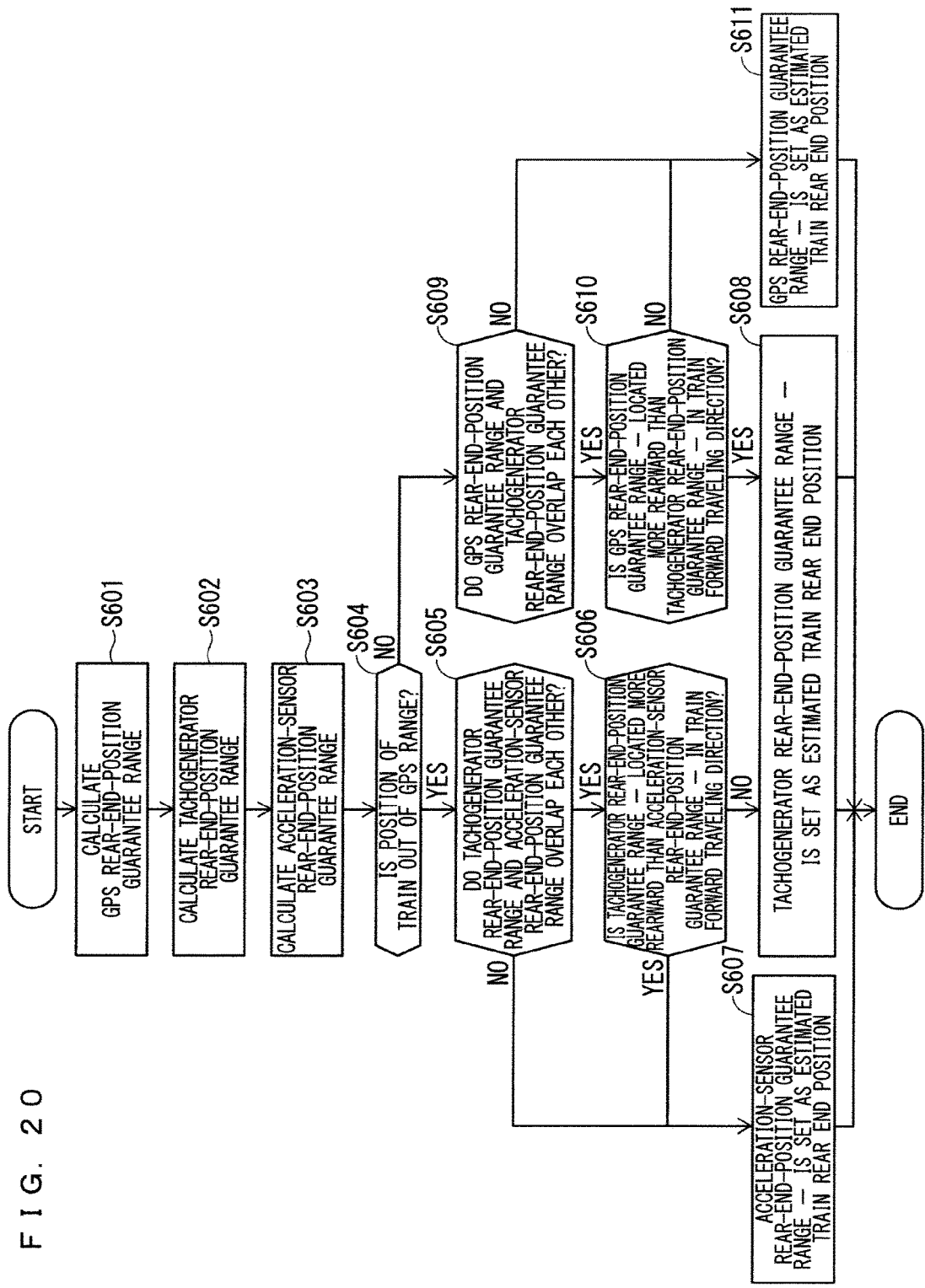
FIG. 20 is a flowchart illustrating an operation of the train position detecting device according to the sixth embodiment.

FIG. 20 is a flowchart illustrating an operation of the train position detecting device 100E. The operation of the train position detecting device 100E will be described below with reference to FIGS. 19 and 20.

The GPS position guarantee range calculation part 2 calculates the GPS position guarantee range 103 in a manner similar to the first embodiment. In addition, the GPS position guarantee range calculation part 2 holds an offset distance from the installation position of the GPS antenna 1 to the rear end of the train, and calculates a GPS rear-endposition guarantee range by adding the offset distance to the GPS position guarantee range 103 (step S601).

Next, the tachogenerator-position guarantee range calculation part 4 calculates the tachogenerator-position guarantee range 105 in a manner similar to the first embodiment. In addition, the tachogenerator-position guarantee range calculation part 4 holds an offset distance from the measured axle mounted with the tachometer generator 3 to the rear end of the train, and calculates a tachogenerator rear-end-position guarantee range by adding the offset distance to the tachogenerator-position guarantee range 105 (step S602).

Figure 21A:
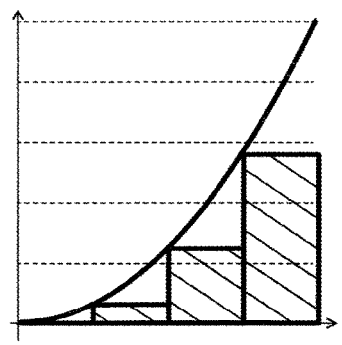
FIG. 21A shows a chart illustrating quadrature by parts.
Figure 21B:
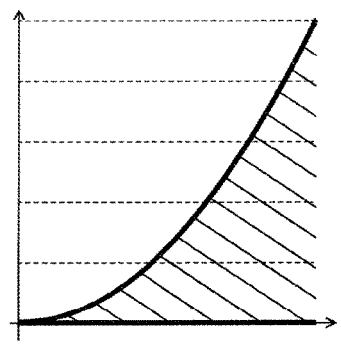
FIG. 21B shows a chart illustrating quadrature by parts.
Figure 21C:
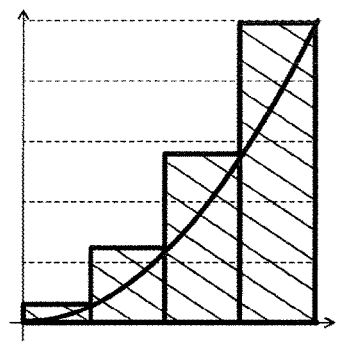
FIG. 21C shows a chart illustrating quadrature by parts.

Next, the acceleration-sensor-position guarantee range calculation part 9 calculates the acceleration-sensor-position guarantee range 111 by integrating the train acceleration 110 over time twice. More specifically, the integration is performed by a principle of quadrature by parts shown in FIGS. 21A to 21C. In FIGS. 21A to 21C, an oblique line part indicates a cubage value or a true value. FIG. 21A shows a left edge pattern of the quadrature by parts; FIG. 21B shows a true value; and FIG. 21C shows a right edge pattern of the quadrature by parts. A minimum value is obtained by the left edge pattern, and a maximum value is obtained by the right edge pattern. The true value falls within this range from the minimum value to the maximum value, and has a calculation error. In addition, the acceleration-sensor-position guarantee range calculation part 9 holds an offset distance from the installation position of the acceleration sensor 8 to the rear end of the train, and calculates a position guarantee range of the rear end of the train (referred to as an "acceleration-sensor rear-end-position guarantee range") by adding the offset distance to the acceleration-sensor-position guarantee range 111 (step S603).

Next, the guarantee range comparing part 6 determines whether or not the position of the train is out of GPS range. More specifically, the determination is made based on, for example, a signal-reception determining function provided in a GPS (step S604).

When the train is traveling in an area out of GPS range, the guarantee range comparing part 6 determines whether or not the acceleration-sensor rear-end-position guarantee range and the tachogenerator rear-end position guarantee range overlap each other (step S605).

When both of the ranges overlap each other, the guarantee range comparing part 6 determines whether or not the tachogenerator rear-end-position guarantee range– is located more rearward than the acceleration-sensor rear-end-position guarantee range– in the train forward traveling direction (step S606).

When it is determined that the tachogenerator rear-end-position guarantee range– is located more rearward, the acceleration-sensor rear-end-position guarantee range– is set as the estimated train rear end position (step S607). When it is determined that the tachogenerator rear-end-position guarantee range– is not located more rearward, the tachogenerator rear-end-position guarantee range– is set as the estimated train rear end position (step S608).

When the tachogenerator rear-end-position guarantee range and the acceleration-sensor rear-end-position guarantee range do not overlap each other, it is considered that the train is in an area out of GPS range, and an idling slip causes a large deviation between the true train position and the train position measured by the tachometer generator 3. Accordingly, the acceleration-sensor rear-end-position guarantee range– is set as the estimated train rear end position (step S607).

Meanwhile, when the train is traveling in an area falling within GPS range, without using the acceleration-sensor-position guarantee range 111, a determination is made as to whether or not the GPS rear-end-position guarantee range and the tachogenerator rear-end position guarantee range overlap each other (step S609).

When both of the ranges overlap each other, the guarantee range comparing part 6 determines whether or not the GPS rear-end-position guarantee range– is located more rearward than the tachogenerator rear-end-position guarantee range– in the train forward traveling direction (step S610).

When it is determined that the GPS rear-end-position guarantee range– is located more rearward, the tachogenerator rear-end-position guarantee range– is set as the estimated train rear end position (step S608). When it is determined that the GPS rear-end-position guarantee range– is not located more rearward, the GPS rear-end-position guarantee range– is set as the estimated train rear end position (step S611).

When the GPS rear-end-position guarantee range and the tachogenerator rear-end-position guarantee range do not overlap each other, the GPS rear-end-position guarantee range– is set as the estimated train rear end position (step S611).

<F-3. Modified Example>

The method in which a rear end position of the train is estimated by using the acceleration sensor in addition to the processing of the first embodiment has been described as above. Similarly, a front end position of the train can also be estimated by using the acceleration sensor in addition to the processing of the second embodiment.

In addition, the GPS position guarantee range calculation part 2 holds an offset distance from the installation position of the GPS antenna to the rear end of the train. However, the offset distance may be held by the railway line information storage part 5.

Moreover, the tachogenerator-position guarantee range calculation part 4 holds an offset distance from the measured axle mounted with the tachometer generator to the rear end of the train. However, the offset distance may be held by the railway line information storage part 5.

Further, the acceleration-sensor-position guarantee range calculation part 9 holds an offset distance from the position, at which the acceleration sensor is mounted, to the rear end of the train. However, the offset distance may be held by the railway line information storage part 5.

Furthermore, in FIG. 20, after the GPS rear-end-position guarantee range is calculated (step S601), the tachogenerator-position guarantee range is calculated (step S602), and subsequently the acceleration-sensor rear-end-position guarantee range is calculated (step S603). However, steps S601, 602, 603 may be in any order.

Besides the above, a modified example similar to that of the first embodiment is also applied to the sixth embodiment.

<F-4. Effects>

The train position detecting device 100E according to the sixth embodiment uses the position guarantee range based on the acceleration sensor in the train position detecting device 100A according to the first embodiment. This enables highly accurate estimation of a train position even in a case where an idling slip causes a large deviation between the true train position and the measurement result obtained by the tachometer generator in an area out of OPS range such as a tunnel.

It should be noted that in the present invention, the embodiments may be freely combined, and each embodiment may be modified or omitted as appropriate, within the scope of the invention.

Reference Signs List

1: GPS antenna
2: GPS position guarantee range calculation part
3: Tachometer generator
4: Tachogenerator-position guarantee range calculation part
5: Railway line information storage part
6: Guarantee range comparing part
7: Position determination part
8: Acceleration sensor
9: Acceleration-sensor-position guarantee range calculation part
100A, 100B, 100C, 100D, 100E: Train position detecting device
101: GPS signal
102: Railway line information
103: GPS position guarantee range
104: Wheel rotation number signal
105: Tachogenerator-position guarantee range
106: Comparison result
107, 108: Estimated train rear end position
109: Estimated train front end position
110: Train acceleration
111: Acceleration-sensor-position guarantee range

The invention claimed is:

1. A train position detecting device comprising:
an absolute position guarantee range calculation part for calculating, based on a result of measurement of a position of a train by an absolute distance measuring sensor, an absolute position guarantee range that is an estimated range of a position of an end part of the train in consideration of a measurement error;
a relative position guarantee range calculation part for calculating, based on a result of measurement of a position of the train by a relative distance measurement sensor that measures a relative distance from a measurement carried out previously, a relative position guarantee range that is an estimated range of a position of an end part of said train in consideration of a measurement error; and
a position determination part that sets one of a train forward traveling direction and a train backward traveling direction to be a first direction and the other to be a second direction, and determines, between an end part of said absolute position guarantee range in the first direction and an end part of said relative position guarantee range in the first direction, a position of an end part on a positive side of the second direction to be a position of the end part of the train in the first direction,
wherein said absolute position guarantee range includes an absolute rear-end-position guarantee range that is an estimated range of a position of a rear end part of the train,
said relative position guarantee range includes a relative rear-end-position guarantee range that is an estimated range of a position of the rear end part of the train,
said position determination part determines, between an end part of said absolute rear-end-position guarantee range in the train backward traveling direction and an end part of said relative rear-end-position guarantee range in the train backward traveling direction, a position of the end part on the positive side of the train forward traveling direction to be a position of the rear end part of the train, and
said relative position guarantee range calculation part accumulates a newly measured value by said relative distance measurement sensor and a measurement error thereof to a relative rear-end-position guarantee-range initial value, which is calculated based on the measurement result previously obtained by said relative distance measurement sensor, to calculate said relative rear-end-position guarantee range, and when an end part of said relative rear-end-position guarantee-range initial value in the train backward traveling direction is more on a negative side of the train forward traveling direction than the position of the rear end part of the train previously determined by said position determination part, calculates said relative rear-end-position guarantee range by using, as said relative rear-end-position guarantee-range initial value, the position of the rear end part of the train previously determined by said position determination part.

2. The train position detecting device according to claim 1, wherein
when said absolute rear-end-position guarantee range and said relative rear-end-position guarantee range do not overlap each other, said position determination part determines a position of an end part of said absolute rear-end-position guarantee range in the train backward traveling direction to be a position of the rear end part of the train.

3. The train position detecting device according to claim 1, wherein
when a position of the rear end part of the train determined previously is more on the positive side of the train forward traveling direction than the end part that is on the positive side of the train forward traveling direction, between the end part of said absolute rear-end-position guarantee range in said train backward traveling direction and the end part of said relative rear-end-position guarantee range in said train backward traveling direction, said position determination part determines the position of the rear end part of the train determined previously to be a current rear end position of the train.

4. A train position detecting device comprising:
an absolute position guarantee range calculation part for calculating, based on a result of measurement of a position of a train by an absolute distance measuring sensor, an absolute position guarantee range that is an estimated range of a position of an end part of the train in consideration of a measurement error;
a relative position guarantee range calculation part for calculating, based on a result of measurement of a position of the train by a relative distance measurement sensor that measures a relative distance from a measurement carried out previously, a relative position guarantee range that is an estimated range of a position of an end part of said train in consideration of a measurement error; and
a position determination part that sets one of a train forward traveling direction and a train backward traveling direction to be a first direction and the other to be a second direction, and determines, between an end part of said absolute position guarantee range in the first direction and an end part of said relative position guarantee range in the first direction, a position of an end part on a positive side of the second direction to be a position of the end part of the train in the first direction, wherein said absolute position guarantee range includes an absolute front-end-position guarantee range that is an estimated range of a position of a front end part of the train, said relative position guarantee range includes a relative front-end-position guarantee range that is an estimated range of a position of the front end part of the train, said position determination part determines, between an end part of said absolute front-end-position guarantee range in the train forward traveling direction and an end part of said relative front-end-position guarantee range in the train forward traveling direction, a position of the end part on the positive side of the train backward traveling direction to be a position of the front end part of the train, and said relative position guarantee range calculation part accumulates a newly measured value by said relative distance measurement sensor and a measurement error thereof to a relative front-end-position guarantee-range initial value, which is said relative front-end-position guarantee range calculated based on the measurement result previously obtained by said relative distance measurement sensor, to calculate said relative front-end-position guarantee range, and when an end part of said relative front-end-position guarantee-range initial value in the train forward traveling direction is more on the positive side of the train forward traveling direction than the position of the front end part of the train previously determined by said position determination part, calculates said relative front-end-position guarantee range by using, as said relative front-end-position guarantee-range initial value, the position of the front end part of the train previously determined by said position determination part.

5. The train position detecting device according to claim 4, wherein when said absolute front-end-position guarantee range and said relative front-end-position guarantee range do not overlap each other, said position determination part determines a position of an end part of said absolute front-end-position guarantee range in the train forward traveling direction to be a position of the front end part of the train.

* * * * *